United States Patent
Daiku et al.

(10) Patent No.: US 9,076,373 B2
(45) Date of Patent: Jul. 7, 2015

(54) DISPLAY APPARATUS AND METHOD OF CONTROLLING IMAGES

(75) Inventors: Yasuhiro Daiku, Saitama (JP); Hidehiro Morita, Tokyo (JP)

(73) Assignee: Samsung Display Co., LTD., Yongin (KR)

( * ) Notice: Subject to any disclaimer, the term of this patent is extended or adjusted under 35 U.S.C. 154(b) by 430 days.

(21) Appl. No.: 12/887,889

(22) Filed: Sep. 22, 2010

(65) Prior Publication Data

US 2011/0234582 A1 Sep. 29, 2011

(30) Foreign Application Priority Data

Sep. 24, 2009 (JP) ................................. 2009-218702

(51) Int. Cl.
| | | |
|---|---|---|
| G06T 15/00 | (2011.01) | |
| G02B 27/22 | (2006.01) | |
| G09G 3/20 | (2006.01) | |
| H04N 13/04 | (2006.01) | |
| G09G 3/00 | (2006.01) | |

(52) U.S. Cl.
CPC .............. *G09G 3/20* (2013.01); *G02B 27/2214* (2013.01); *G02F 2201/16* (2013.01); *G02F 2203/12* (2013.01); *G09G 3/001* (2013.01); *G09G 3/003* (2013.01); *G09G 2300/023* (2013.01); *G09G 2300/0452* (2013.01); *G09G 2320/0613* (2013.01); *G09G 2340/0492* (2013.01); *H04N 13/0409* (2013.01); *H04N 13/0413* (2013.01); *H04N 13/0415* (2013.01); *H04N 13/0422* (2013.01); *H04N 13/0452* (2013.01)

(58) Field of Classification Search
CPC ........... G02B 27/2214; H04N 13/0422; H04N 13/0409; H04N 13/0406
USPC .................................. 345/419; 359/462, 463
IPC ....................................................... G02B 27/22
See application file for complete search history.

(56) References Cited

U.S. PATENT DOCUMENTS

| | | | |
|---|---|---|---|
| 5,315,377 A | 5/1994 | Isono et al. | |
| 2002/0141056 A1* | 10/2002 | Kobayashi et al. | 359/462 |
| 2005/0099688 A1* | 5/2005 | Uehara et al. | 359/462 |

(Continued)

FOREIGN PATENT DOCUMENTS

| | | |
|---|---|---|
| GB | 2415849 A | 1/2006 |
| GB | 2415850 A | 1/2006 |

(Continued)

OTHER PUBLICATIONS

Japanese Office Action dated Dec. 6, 2011, in a counterpart Japanese patent application No. 2009-218702.

(Continued)

*Primary Examiner* — Jay Patel
*Assistant Examiner* — Neil Mikeska
(74) *Attorney, Agent, or Firm* — Jefferson IP Law, LLP

(57) ABSTRACT

A display apparatus for displaying a three-dimensional image using a parallax barrier scheme includes a display module having a display region in which a plurality of pixels are arranged, and a parallax barrier facing the display region. In the parallax barrier, a plurality of aperture regions are formed as light-transmissive regions so that each one of the aperture regions corresponds to a predetermined number of the pixels. In one embodiment, each of the aperture regions is in a shape that exhibits an identical shape when rotated by 90 degrees.

24 Claims, 17 Drawing Sheets

(56) References Cited

U.S. PATENT DOCUMENTS

2006/0126177 A1    6/2006  Kim et al.
2006/0132916 A1*   6/2006  Oikawa et al. .............. 359/463
2008/0231767 A1    9/2008  Lee

FOREIGN PATENT DOCUMENTS

| JP | H05-122733 A  | 5/1993  |
|----|---------------|---------|
| JP | H10-221646 A  | 8/1998  |
| JP | H10-232366 A  | 9/1998  |
| JP | 2006-018282 A | 1/2006  |
| JP | 2006-154809 A | 6/2006  |
| JP | 2006-276406 A | 10/2006 |
| JP | 2009-506357 A | 2/2009  |
| JP | 2009-086128 A | 4/2009  |
| TW | 200935138 A   | 8/2009  |
| WO | 2007024118 A1 | 3/2007  |

OTHER PUBLICATIONS

Japanese Office Action dated Aug. 30, 2011, in a counterpart Japanese patent application No. 2009-218702, citing Foreign Patent document Nos. 1-5 above and JP2009-506357, which has been submitted in a previous IDS.

* cited by examiner

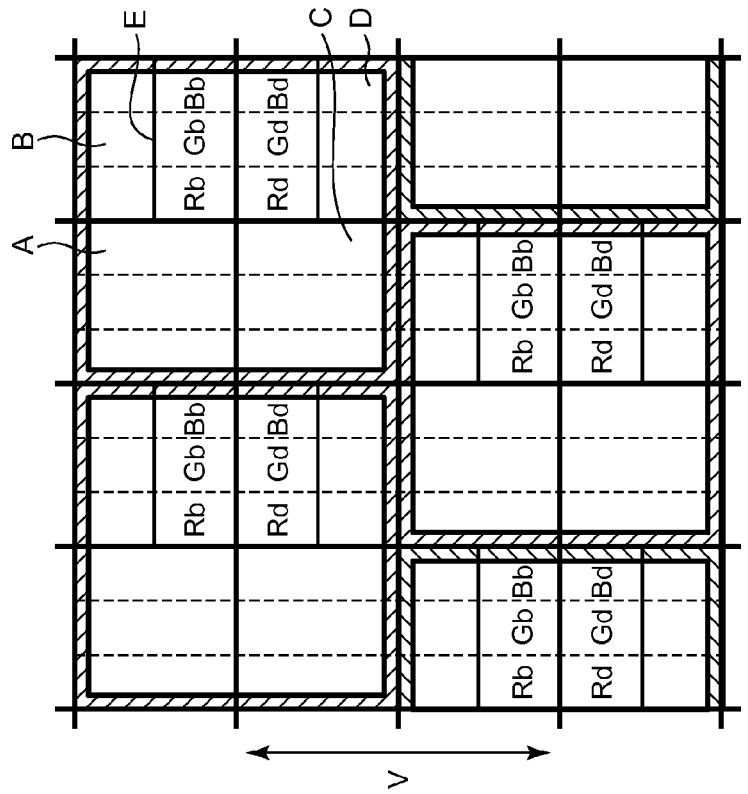
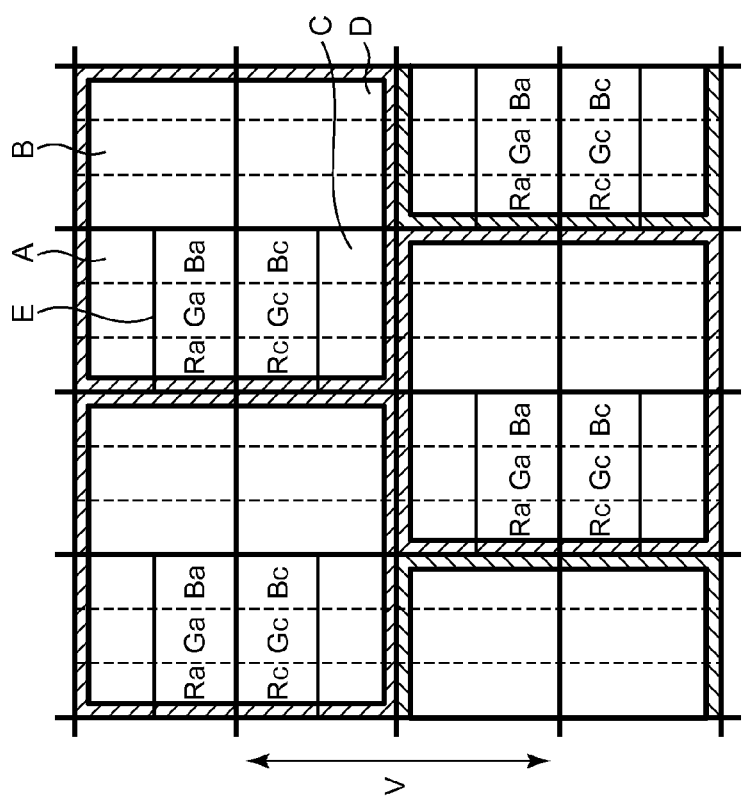

DISPLAY APPARATUS AND METHOD OF CONTROLLING IMAGES

CROSS-REFERENCE TO RELATED APPLICATIONS

This application is based upon and claims the benefit of priority from prior Japanese Patent Application No. 2009-218702, filed Sep. 24, 2009, the entire contents of which are hereby incorporated by reference.

BACKGROUND OF THE INVENTION

1. Field of the Invention

The present invention relates to technology for displaying a three-dimensional image using a parallax barrier system.

2. Description of the Related Art

Conventionally, a parallax barrier system has been known as a method for achieving the display of three-dimensional images without using special glasses. A display apparatus using a parallax barrier system mainly comprises a display device that displays a left eye image and a right eye image by alternately aligning component images of the left eye and right eye images on every other vertical lines; and a parallax barrier that is placed in front of the display apparatus (the left eye image and the right eye image). The parallax barrier comprises a plurality of barrier regions that extend in a vertical direction of the left eye image and the right eye image and are aligned in the same pitch as the left eye image and the right eye image in a horizontal direction thereof; and a plurality of slit regions that are formed between the barrier regions. Further, in the parallax barrier system, a viewer views the display device through the parallax barrier away from a predetermined specific distance while viewing the left eye image only with his/her left eye and the right eye image only with his/her right eye, thereby recognizing a three-dimensional image; or, in other words, viewing a displayed image three-dimensionally.

WO 2007/024118A1 (Laid-open Japanese Patent Application No. 2009-506357), for example, discloses a display apparatus that has a parallax barrier constructed of a dot matrix type liquid crystal panel and controls a left eye image and a right eye image to be displayed on the display device as well as a pattern of the parallax barrier to be displayed (formed) on the liquid crystal panel. Specifically, the above-mentioned WO 2007/024118A1 discloses a display apparatus that, when the angle of the display device thereof is rotated 90 degrees, maintains a condition in which the left eye image and the right eye image are aligned in a horizontal (left-right) direction to the viewer's eye by displaying the left eye image and the right eye image that are rotated 90 degrees on the display device; and at the same time that maintains a condition in which a plurality of barrier regions are aligned in a horizontal (left-right) direction by displaying a parallax barrier in which a plurality of the barrier regions (slit regions) are aligned in a direction perpendicular to the direction prior to the rotation, that is, a parallax barrier possessing a different pattern. According to the display apparatus just described, it is possible to make the viewer recognize a three-dimensional image without any problem even when the display device changes its angle by rotating 90 degrees while a three-dimensional image is being displayed, for example.

However, in the above-mentioned display apparatus, it is necessary to control the patterns of the parallax barrier according to the angle of the display device displaying the image so that a plurality of the barrier regions (the slit regions) are always aligned in a left-right direction to the viewer's eye so that the viewer can recognize a three-dimensional image.

SUMMARY OF THE INVENTION

One aspect of a display apparatus for displaying a three-dimensional image using a parallax barrier system according to the present invention comprises a display module in whose display region a plurality of pixels are arranged, and a parallax barrier that is installed to face the display region. In the parallax barrier, a plurality of aperture regions as light-transmissive regions are formed so that one aperture region corresponds to the predetermined number of the pixels, and each of the aperture regions is formed in a shape that is rotationally symmetric when rotated 90 degrees.

Another aspect of a display apparatus for displaying a three-dimensional image using a parallax barrier system according to the present invention comprises a display module having, in a display region, a first pixel, a second pixel adjacent to the first pixel in a first direction, a third pixel adjacent to the first pixel in a second direction perpendicular to the first direction, and a forth pixel adjacent to the third pixel in the first direction; a parallax barrier installed to face the display region; a control unit that allocates pixel data to the pixels; and a judgment unit that judges a rotation condition of the display module. When it is judged by the judgment unit that the display module is in a first rotation condition, the control unit allocates identical pixel data as a right eye image to the first and second pixels and identical pixel data as a left eye image to the third and forth pixels; and when it is judged by the judgment unit that the display module is in a second rotation condition in which the display module is rotated 90 degrees from the first rotation condition in a predetermined direction, the control unit allocates identical pixel data as a right eye image to the second and forth pixels and identical pixel data as a left eye image to the first and third pixels.

Also, one aspect of an image control method for displaying a three-dimensional image using a parallax barrier system according to the present invention comprises the steps in which, when a display module is in a first rotation condition, identical pixel data as a right eye image are allocated to a first pixel and to a second pixel adjacent to the first pixel in a first direction while identical pixel data as a left eye image are allocated to a third pixel adjacent to the first pixel in a second direction perpendicular to the first direction and to a forth pixel adjacent to the third pixel in the first direction; and in which, when the display module is in a second rotation condition and is rotated 90 degrees from the first rotation condition in a predetermined direction, identical pixel data as a right eye image are allocated to the second and forth pixels while identical pixel data as a left eye image are allocated to the first and third pixels.

In another aspect, the present invention provides a display apparatus for displaying a three-dimensional image using a parallax barrier scheme, including a display module having a display region having a plurality of pixels; and a parallax barrier unit facing the display region, the parallax barrier unit being configured to display a parallax barrier having a plurality of aperture regions for at least a portion of the display region, each of the aperture regions corresponds to a predetermined number of pixels, each of the aperture regions being in a shape that exhibits an identical shape when rotated 90 degrees.

In another aspect, the present invention provides a display apparatus for displaying a three-dimensional image using a parallax barrier scheme, including a display module having a display region in which a first pixel, a second pixel adjacent to the first pixel in a first direction, a third pixel adjacent to the first pixel in a second direction perpendicular to the first direction, and a forth pixel adjacent to the third pixel in the first direction are formed; a parallax barrier unit facing the display region, the parallax barrier unit being configured to display a parallax barrier; a control unit allocating pixel data to the pixels; and a judgment unit judging a rotational condition of the display module, wherein the control unit allocates a same pixel data as a right eye image to the first pixel and the second pixel and also allocates a same pixel data as a left eye image to the third pixel and the forth pixel when the judgment unit judges the rotational condition of the display module to be in a first rotational condition, and wherein the control unit allocates a same pixel data as a right eye image to the second pixel and the forth pixel and also allocates a same pixel data as a left eye image to the first pixel and the third pixel when the judgment unit judges the rotational condition of the display module to be in a second rotational condition that is rotated clockwise by 90 degrees from the first rotational condition.

In another aspect, the present invention provides an image control method for displaying a three-dimensional image using a parallax barrier scheme, including allocating a same pixel data as a right eye image to a first pixel and to a second pixel that is adjacent to the first pixel in a first direction and allocating a same pixel data as a left eye image to a third pixel that is adjacent to the first pixel in a second direction perpendicular to the first direction and to a forth pixel that is adjacent to the third pixel in the first direction, when a display module is in a first rotational condition; and allocating a same pixel data as a right eye image to the second pixel and to the forth pixel and allocating a same pixel data as a left eye image to the first pixel and to the third pixel, when the display module is in a second rotational condition that is rotated clockwise by 90 degrees from the first rotational condition.

In another aspect, the present invention provides a display apparatus for displaying a three-dimensional image using a parallax barrier scheme, including a display module having a display region in which a plurality of pixels are arranged; and a parallax barrier unit facing the display region, the parallax barrier unit being configured to display a parallax barrier having a plurality of aperture regions for at least a portion of the display region such that each of the aperture regions corresponds to a predetermined group of pixels, each of the aperture regions being arranged and having a shape such that a left eye and a right eye of a viewer respectively receive light from mutually exclusive subgroups of pixels among said group of pixels when the display module is oriented horizontally with respect to the eyes of the viewer and such that the left eye and the right eye of the viewer respectively receive light from mutually exclusive different subgroups of pixels among said group of pixels when the display module is oriented vertically with respect to the eyes of the viewer.

According to at least some of the aspects of the present invention, it is possible to eliminate the necessity of changing patterns of a parallax barrier according to the change in an angle of a display device or display module while realizing a three-dimensional view of a displayed image using a parallax barrier system even when the display device displaying the image is rotated 90 degrees in a predetermined direction.

Other advantages and features of the invention will be set forth in the description which follows, and in part will be apparent or obvious from the description, or may be learned by practice of the invention.

The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14A is a schematic view showing a visible region of a display module visible to a viewer's right eye when a display unit is in a horizontal position.

FIG. 14B is a schematic view showing a visible region of a display module visible to a viewer's left eye when a display unit is in a horizontal position.

DETAILED DESCRIPTION OF THE INVENTION

Preferred embodiments of the present invention are described as follows.

First Embodiment

Figure 1:
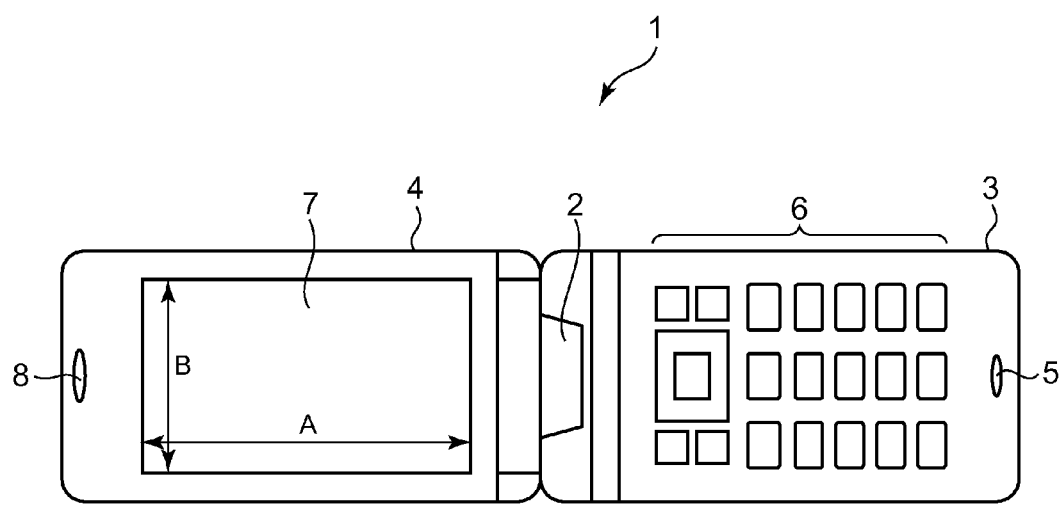
FIG. 1 is an external view of a mobile phone unit with a display apparatus according to the present invention.

A first embodiment of the present invention is described as follows. FIG. 1 is an external view of a mobile phone unit 1 equipped with a display apparatus according to an embodiment of the present invention. The mobile phone unit 1 is a foldable type unit and comprises a main body 3 and a flap 4, which are connected with a hinge 2 to open and close freely. FIG. 1 shows a condition in which the flap 4 is opened.

The main body 3 features a microphone 5 for audio input and a set of operation buttons 6 to be used by a user in operating the mobile phone unit 1. The flap 4 features a rectangular display unit 7 for displaying letters, images, and other various types of information, and a speaker 8 for audio output.

Figure 2:
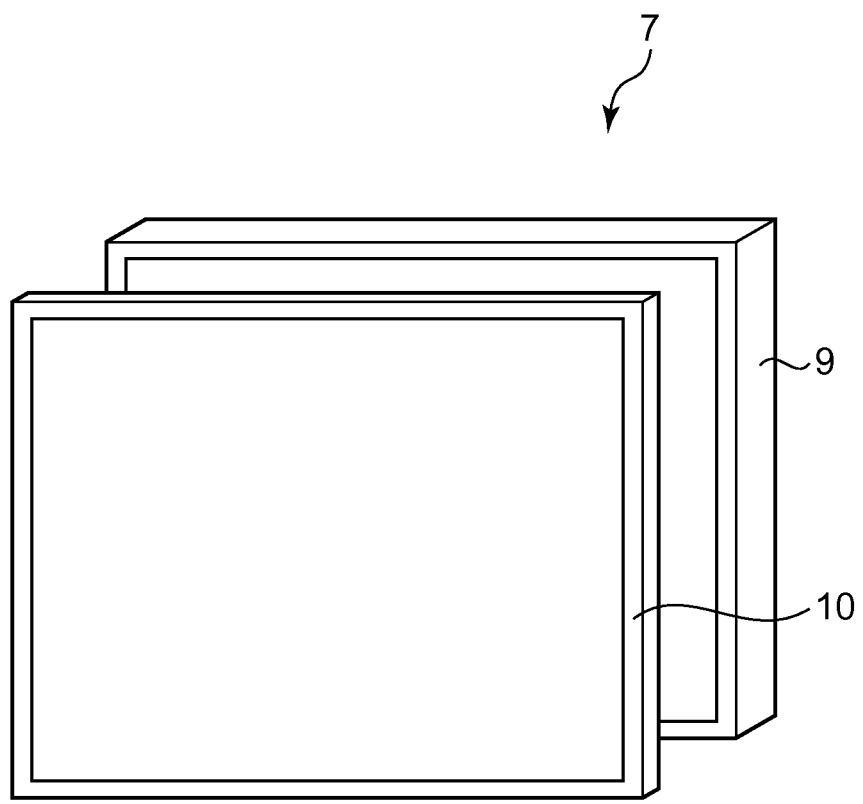
FIG. 2 is a perspective view outlining a structure of a display unit.

FIG. 2 is a perspective view outlining a structure of the display unit 7. The display unit 7 is constructed to allow the display of a three-dimensional image using a parallax barrier system and comprises a display module 9, which is built in the flap 4 so that a display region described later is exposed from the flap 4, and a barrier display element (parallax barrier unit) 10, which is placed in front of the display module 9.

The display module 9 is a display apparatus possessing a display region on which information such as letters and images are displayed and functions as a display means of the present embodiment. Image information displayed by the display module 9 include a normal still or moving image, and also a still and moving image that is composed of a pair of a left eye image and a right eye image and is recognized as a three-dimensional image by a viewer. In the following description, a normal still or moving image is referred to as a 2D (two-dimensional) image and a still or moving image composed of a pair of a left eye image and a right eye image is referred to as a 3D (three-dimensional) image.

The display module 9 is a transmissive type or self light emitting type display device, which possesses display elements (hereinafter referred to as sub-pixels) such as liquid crystal elements, EL (Electroluminescence) elements, and so forth, for example, and also is a dot matrix type display device in which a plurality of display elements are arranged in both vertical and horizontal directions. For each of the sub-pixels of the display module 9, one of three colors including red (R), green (G), or blue (B) is respectively allocated to each sub-pixel by a color filter, for example, in accordance with a designated color pattern.

Figure 4A:
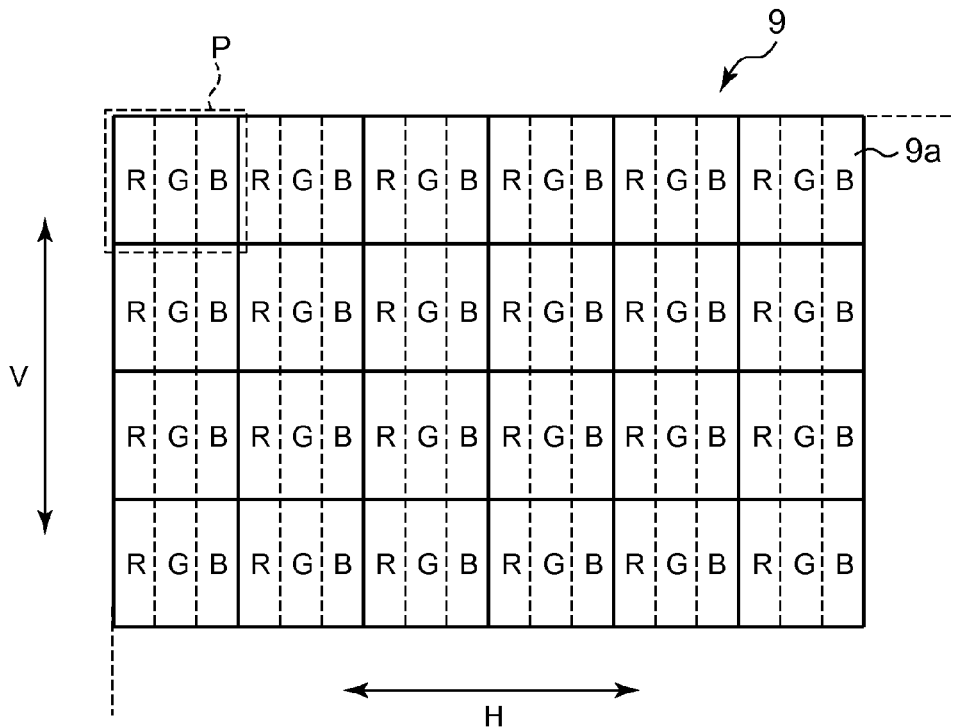
FIG. 4A is a schematic view showing a pixel arrangement in a display region of a display module.

FIG. 4A shows a pixel arrangement in the display region of the display module 9. Specifically, in the display module 9, a sub-pixel 9a is in a rectangular shape, and the ratio of the length of the short side to the long side thereof, or the side in a direction of horizontal line H to the side in a direction of vertical line V as indicated in FIG. 4A, is 1 to 3. Also, the color pattern corresponding to each of the sub-pixels 9a of the display module 9 is designed so that all of the three colors R, G, and B are allocated repeatedly and orderly to each row in the horizontal line direction H while one of the three colors is allocated to each column in the vertical line direction V. In other words, the color filter is constructed to have a so-called stripe arrangement. Further, in the display module 9, one pixel P is composed of three sub-pixels 9a, 9a, 9a in the color of R, G, B, respectively, and are aligned in the horizontal line direction H.

And, in the display module 9, an image is color-displayed by controlling a gradation level (brightness level) of a set of the sub-pixels comprising each pixel P according to the color of each pixel of the image to be displayed. In other words, an image is color-displayed using a RGB space partitioning method.

Note that in the following description it is assumed that the horizontal line direction H of the display module 9 matches with a long side direction A of the display unit 7 shown in FIG. 1 and that the vertical line direction V of the display module 9 matches with a short side direction B of the display unit 7 shown in FIG. 1.

The barrier display element 10, when a 3D image (a right eye image and a left eye image) is displayed on the display module 9, displays a parallax barrier of the present embodiment possessing a specific pattern to selectively block a light emitted by the display module 9.

Figure 3:
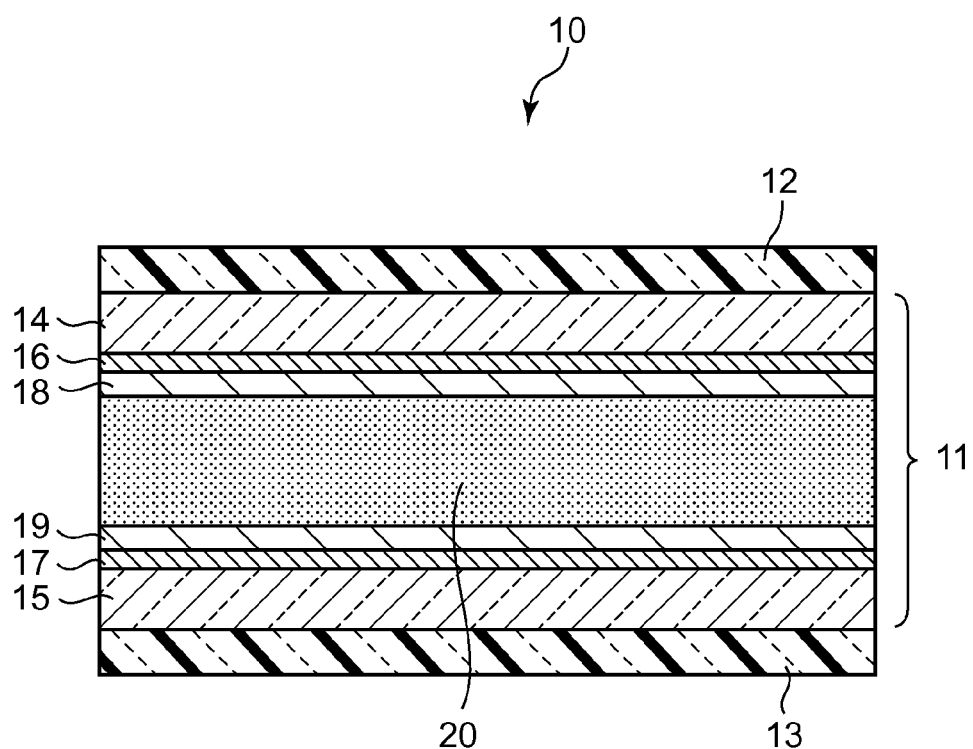
FIG. 3 is a cross-sectional view of a barrier display element.

The barrier display element 10 is a static type TN liquid crystal element, for example, and comprises a liquid crystal cell 11 and a pair of polarizers 12, 13 that are respectively placed on a bottom surface of the liquid crystal cell 11 (the side from which a light enters) and on a top surface thereof (the side from which a light exits), as shown in FIG. 3. The liquid crystal cell 11 comprises transparent electrodes 16, 17 that are formed respectively on opposing surfaces of a pair of transparent substrates 14, 15; alignment films 18, 19 that are coated on the transparent electrodes 16, 17, respectively; and a liquid crystal 20 that is enclosed in a sealed space between the alignment films 18, 19 facing each other.

Also, the barrier display element 10 has a structure generally known as normally white, in which a pair of the polarizers 12, 13 are arranged so that the directions of the polarization caused by each of the polarizers meet at an angle of 90 degrees. Additionally, in the barrier display element 10, either one of the transparent electrode 16 in an upper part of the liquid crystal 11 or the transparent electrode 17 in a lower part of the liquid crystal 11 is in a shape that corresponds to a light-shielding region 100a of a parallax barrier 100, which is described later. Therefore, in the barrier display element 10, a predetermined drive voltage can be applied to the transparent electrodes 16, 17 to display the later-described parallax barrier 100, thereby blocking a light emitted by the display module 9 in a specific region of the pixels. Also, when a predetermined drive voltage is not applied to the transparent electrodes 16, 17, the barrier display element 10 transmits a light emitted by the display module 9 in the entire region of the pixels.

Figure 4B:
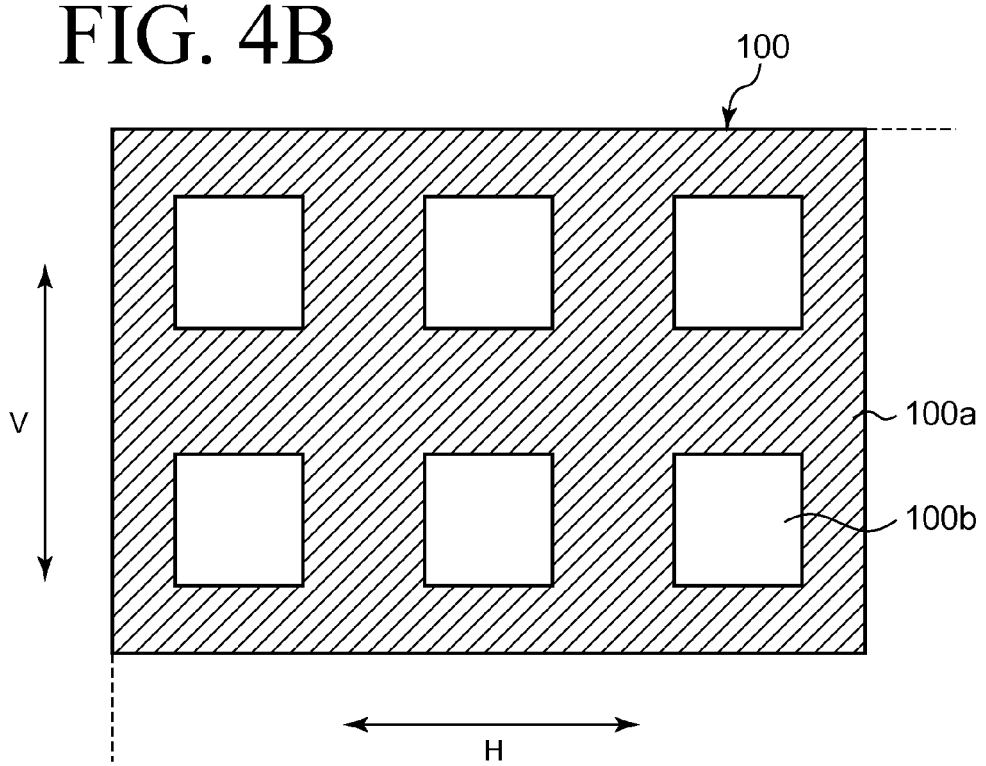
FIG. 4B is a schematic view showing a pattern of a parallax barrier.

FIG. 4B shows a parallax barrier 100, which is displayed by the barrier display element 10. As shown in FIG. 4B, the parallax barrier 100 comprises a light-shielding region 100a, which blocks the light emitted by the display module 9, and a plurality of aperture regions 100b, which are orderly arranged in both vertical and horizontal directions at a specific interval between each other and transmit the light emitted by the display module 9. Note that because the aperture regions 100b shown in FIG. 4B are arranged in a matrix pattern, the arrangement of the aperture regions 100b is hereinafter referred to as a matrix arrangement for convenience.

Each of the aperture regions 100b is in a square shape in this example, which is similar to the shape of the pixel each comprising the three different-colored sub-pixels that are aligned in the horizontal line direction H of the display module 9. The size of the each aperture region 100b is also substantially the same as the size of the each pixel. Note that the size of the aperture region 100b does not necessarily have to be the same as the size of the pixel, but should only be smaller than the size thereof including space between the pixels that are adjacent both vertically and horizontally (space between the arrangement of the sub-pixels 9a).

Each of the aperture regions 100b is respectively arranged in a position corresponding to a pixel group, which comprises four pixels and is obtained by dividing all pixels in the display region of the display module 9 into groups by two pixels in both the horizontal line direction H and the vertical line direction V; that is, a position corresponding to a pixel region, which is in a square shape that is rotationally symmetric about the center when rotating 90 degrees.

In other words, in the parallax barrier 100, a plurality of light-transmissive regions are formed as the aperture regions 100b, each of which corresponds to every four pixels and is in a shape that is rotationally symmetric when rotating 90 degrees.

Note that when the display module 9 displays a 3D image, each of the pixel groups functions as a display component of the 3D image.

Figure 5A:
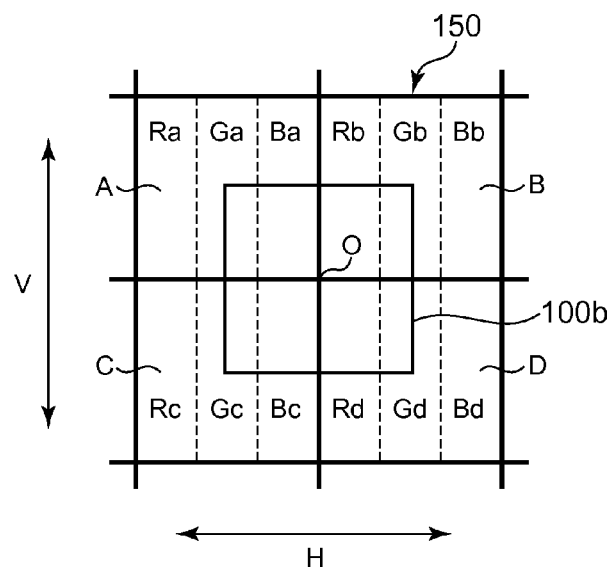
FIG. 5A is a schematic view showing a relation between an aperture region of a parallax barrier and a pixel group of a display module.

A specific position relation between an aperture region 100b of the parallax barrier 100 and a pixel group corresponding to that aperture region 100b is shown in FIG. 5A.

FIG. 5A shows a position relation between an aperture region 100b and a pixel group 150 when the barrier display element 10 is viewed from an observational point, which is a reference point (one point) that exists on a line (normal line) passing through the center of the display region of the barrier display element 10 (the display module 9) and being vertical to a surface of the barrier display element 10 and that is located in a designed, predetermined distance from which a three-dimensional view of a 3D image is possible. Specifically, each of the aperture regions 100b is arranged so that the center thereof is positioned on a line that connects the aforementioned reference point and a center O of the pixel group 150 (pixels A, B, C, D) to which the aperture region 100b is corresponding.

Therefore, when a viewer views the display module 9 from the aforementioned reference point while the parallax barrier 100 is being displayed on the barrier display element 10, respective regions on a screen of the display module 9 visible to the viewer's right eye and left eye through the aperture regions 100b (hereinafter referred to as a visible region) are determined as described below.

Figure 5B:
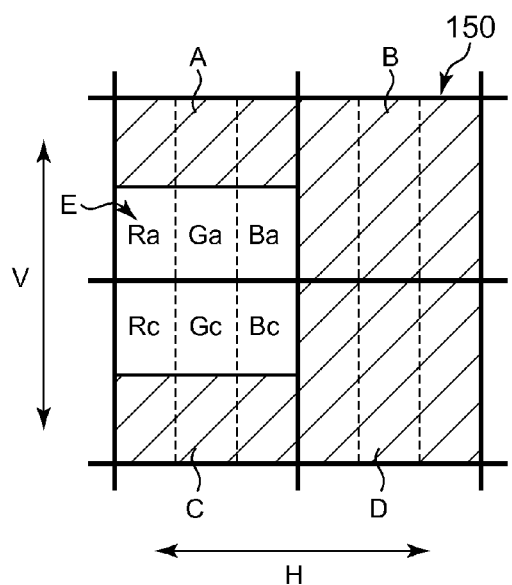
FIG. 5B is a schematic view showing a visible region which is visible to a viewer's right eye.

FIG. 5B shows a visible region E that is visible to the viewer's right eye when the left-right direction to the viewer's eye matches with the horizontal line direction H of the display module 9. As shown in FIG. 5B, the visible region E visible to the viewer's right eye is a region spanning two pixels A, C, which are two vertically-adjacent pixels on the left side of the pixel group 150 to which the aperture region 100b corresponds, and comprising a lower half of the upper left pixel A and an upper half of the lower left pixel C.

Figure 5C:
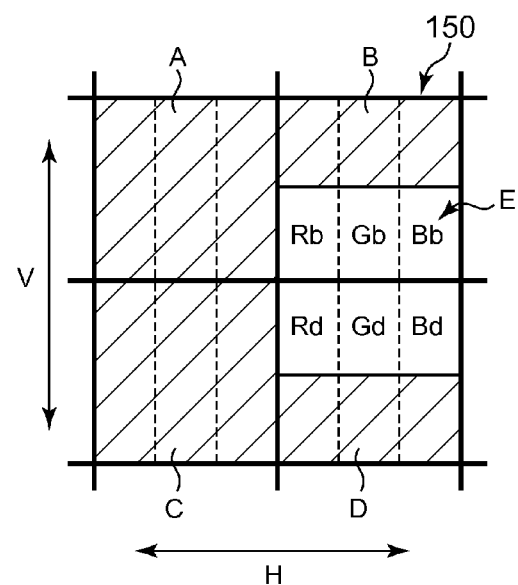
FIG. 5C is a schematic view showing a visible region which is visible to a viewer's left eye.

Additionally, FIG. 5C shows a visible region E that is visible to the viewer's left eye when the left-right direction to the viewer's eye matches with the horizontal line direction H of the display module 9. As shown in FIG. 5C, the visible region E visible to the viewer's left eye is a region spanning two pixels B, D, which are vertically-adjacent pixels on the right side of the pixel group 150 to which the aperture region 100b corresponds, and comprising a lower half of the upper right pixel B and an upper half of the lower right pixel D.

Figure 6A:
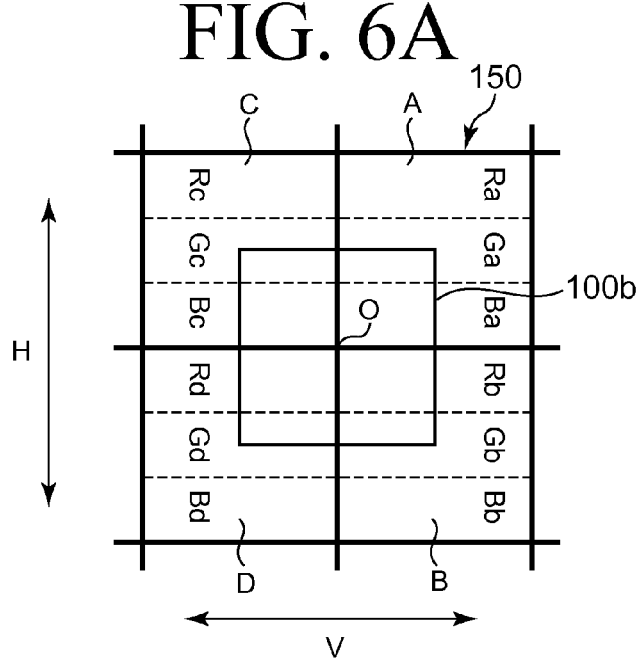
FIG. 6A is a schematic view showing a relation between an aperture region of a parallax barrier and a pixel group of a display module.

Now, a position relation between any of the aperture regions 100b of the parallax barrier 100 and the corresponding pixel group 150 (pixels A, B, C, D) of the display module 9 does not change even when the display unit 7 is rotated 90 degrees, as shown in FIG. 6A. That is, the position relation between the aperture region 100b and the pixel group 150 corresponding to each other does not change even when the left-right direction to the viewer's eye changes to match with the vertical line direction V of the display module 9. Also, as previously described, each of the aperture regions 100b of the parallax barrier 100 is in a square shape in this example. Note that FIG. 6A corresponds to FIG. 5A and shows a condition in which the display unit 7 is rotated 90 degrees in a clockwise direction.

Therefore, for all of the pixel groups 150 of the display module 9, a relative position relation between the four pixels composing each pixel group 150 and the aforementioned visible region does not change even when the display unit 7 (the display module 9 and the barrier display element 10) is rotated 90 degrees. In other words, a relative position relation between the four pixels composing a pixel group 150 and the aforementioned visible region is the same when the left-right direction to the viewer's eye matches with the horizontal line direction H of the display module 9 and when the left-right direction to the viewer's eye matches with the vertical line direction V thereof.

Figure 6B:
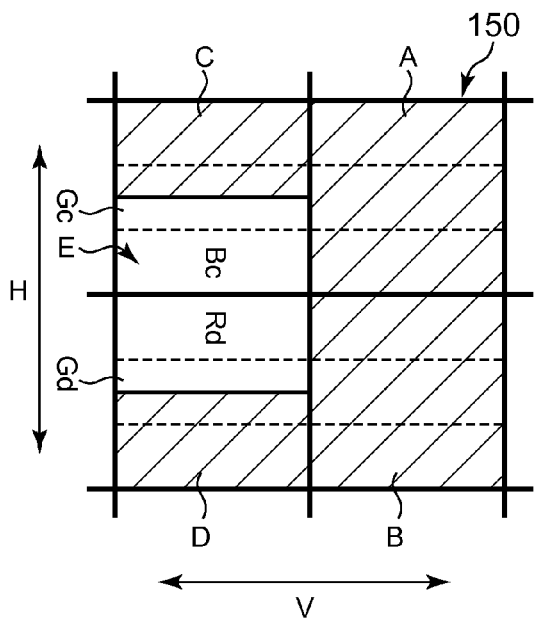
FIG. 6B is a schematic view showing a visible region which is visible to a viewer's right eye.
Figure 6C:
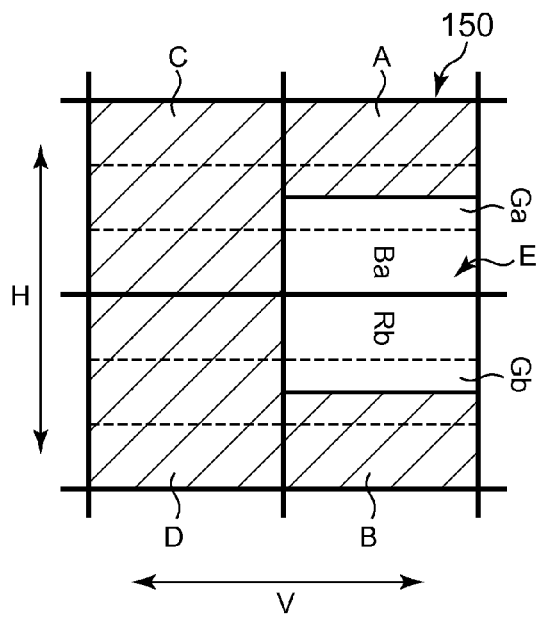
FIG. 6C is a schematic view showing a visible region which is visible to a viewer's left eye.

FIG. 6B corresponds to FIG. 5B and shows a visible region E that is visible to the viewer's right eye when the display unit 7 is rotated 90 degrees in a clockwise direction and the left-right direction to the viewer's eye matches with the vertical line direction V of the display module 9. Also, FIG. 6C corresponds to FIG. 5C and shows a visible region E that is visible to the viewer's left eye when the display unit 7 is rotated 90 degrees in a clockwise direction and the left-right direction to the viewer's eye matches with the vertical line direction V of the display module 9.

However, as previously described, the pixel arrangement of the display module 9 is directional. Therefore, a specific range of the sub-pixels that are contained in the visible region E visible to the viewer's right eye or left eye is different when the left-right direction to the viewer's eye matches with the horizontal line direction H of the display module 9 and when the left-right direction to the viewer's eye matches with the vertical line direction V of the display module 9, as described below.

As shown in FIG. 5B, for example, when the left-right direction to the viewer's eye matches with the horizontal line direction H of the display module 9, the visible region E in each of the pixel groups 150 contains a half region of each of all three colors of sub-pixels Ra, Ga, Ba composing the pixel A, or an upper pixel to the viewer's eye, and a half region of each of all three colors of sub-pixels Rc, Gc, Bc composing the pixel C, or a lower pixel to the viewer's eye.

In contrast, as shown in FIG. 6B, for example, when the left-right direction to the viewer's eye matches with the vertical line direction V of the display module 9, the visible region E in each of the pixel groups 150 contains the following sub-pixels. The visible region E contains a half region of a green sub-pixel Gc and an entire region of a blue sub-pixel Bc, both of which compose the pixel C or an upper pixel to the viewer's eye; and an entire region of a red sub-pixel Rd and a half region of a green sub-pixel Gd, both of which compose the pixel D or a lower pixel to the viewer's eye.

In other words, when the viewer views the display region through the aperture region 100b from a predetermined position, the aperture region 100b is arranged so that the area of the sub-pixels visible to the viewer's right eye is same among the color components, and also that the area of the sub-pixels visible to the same viewer's left eye is same among the color components, both before and after the display module 9 and the parallax barrier 100 are rotated 90 degrees to the viewer's eye. Also, the aperture region 100b is arranged so that two pixels are visible to the viewer's right eye at the same time through one specific aperture region 100b and also that two pixels other than the aforementioned two pixels are visible to the viewer's left eye at the same time through the aforementioned one specific aperture region 100b, both before and after the display module 9 and the parallax barrier 100 are rotated 90 degrees to the viewer's eye. Here, however, a combination of two pixels that are visible at the same time is different before and after the display module 9 and the parallax barrier 100 are rotated 90 degrees to the viewer's eye.

Figure 7:
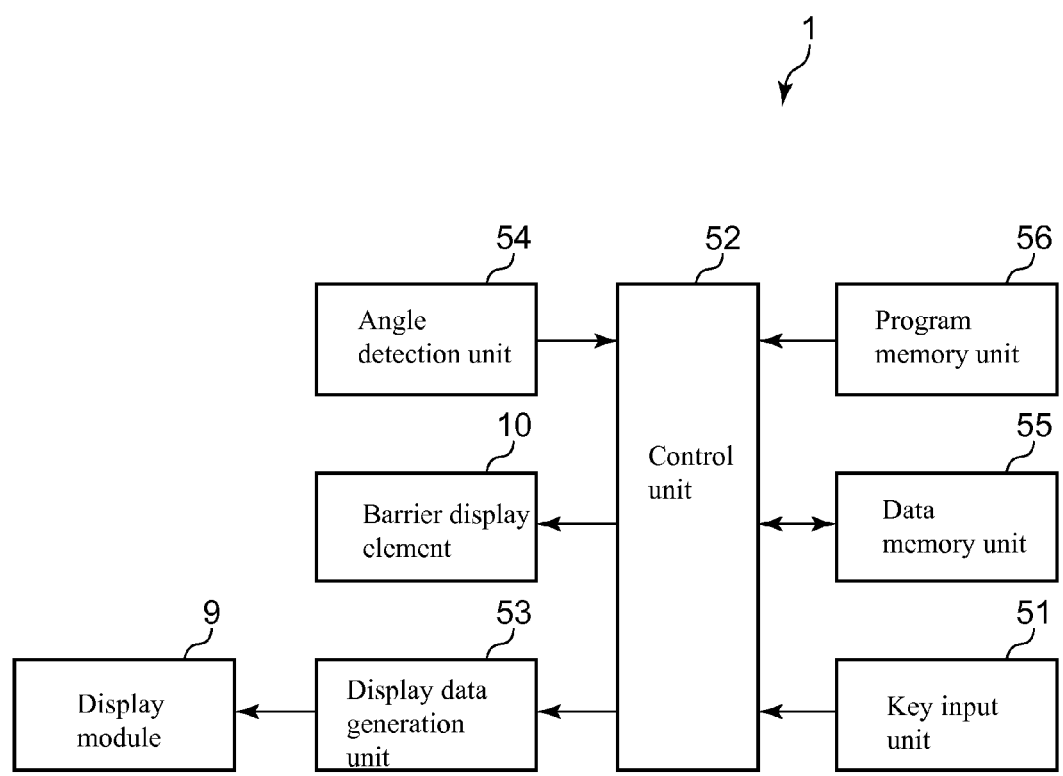
FIG. 7 is a block diagram explaining main parts of an electrical configuration of a mobile phone unit.

FIG. 7 is a block diagram showing main parts of an electrical configuration of the mobile phone unit 1. As shown in FIG. 7, the mobile phone unit 1 comprises a key input unit 51, a control unit 52, a display data generation unit 53, the display module 9 and the barrier display element 10, an angle detection unit 54, a data memory unit 55, and a program memory unit 56.

The key input unit 51 includes a set of operation buttons 6 shown in FIG. 1 and supplies operation signals to the control unit 52 in response to the operation buttons operated by a user.

The control unit 52 comprises a CPU (Central Processing Unit) and its peripheral circuits, a working memory for CPU, and so forth. The control unit 52 controls the mobile phone unit 1 by operating in accordance with a predetermined control program and the operation signals provided by the key input unit 51. Also, the control unit 52 contains a display control circuit and a judgment circuit and performs as needed an image display processing, which is described later, thereby functioning as a display control means and a judgment means of the present embodiment regarding the image display processing, for example.

The display data generation unit 53 generates display data according to data of images, letters, and so forth that are read out from the data memory unit 55 by the control unit 52, and provides the generated display data to the display module 9. Additionally, the display data generation unit 53 functions as a generation means of the present embodiment when generating the display data according to the image data of a 3D image (a right eye image and a left eye image).

The angle detection unit 54 detects a tilt angle of the display unit 7 when the flap 4 of the mobile phone unit 1 is opened (see FIG. 1). Specifically, the angle detection unit 54 comprises an angle sensor installed in the main body 3, an amplifier circuit to amplify signals detected by the angle sensor, a signal processing circuit to process the amplified detected signals, and so forth. The angle detection unit 54 provides the processed detected signals to the control unit 52 as angle information indicating the tilt angle of the display unit 7, thereby functioning as an angle information acquisition means of the present embodiment.

Here, a tilt angle actually detected by the angle detection unit 54 is a tilt angle of the display unit 7 in the rotation direction when a screen of the display unit 7 (a display screen of the display module 9 and the barrier display element 10) is tilted more than a certain angle relative to a horizontal plane.

The data memory unit 55 is a nonvolatile memory such as a flash memory, for example, and stores address information comprising an address book, e-mail data, setting information with regard to various functions of the mobile phone unit 1, and image data of 2D and 3D images.

The program memory unit 56 is a memory such as a ROM (Read Only Memory), for example, in which the aforementioned control program that allows the control unit 52 to control the mobile phone unit 1 is stored.

Figure 8:
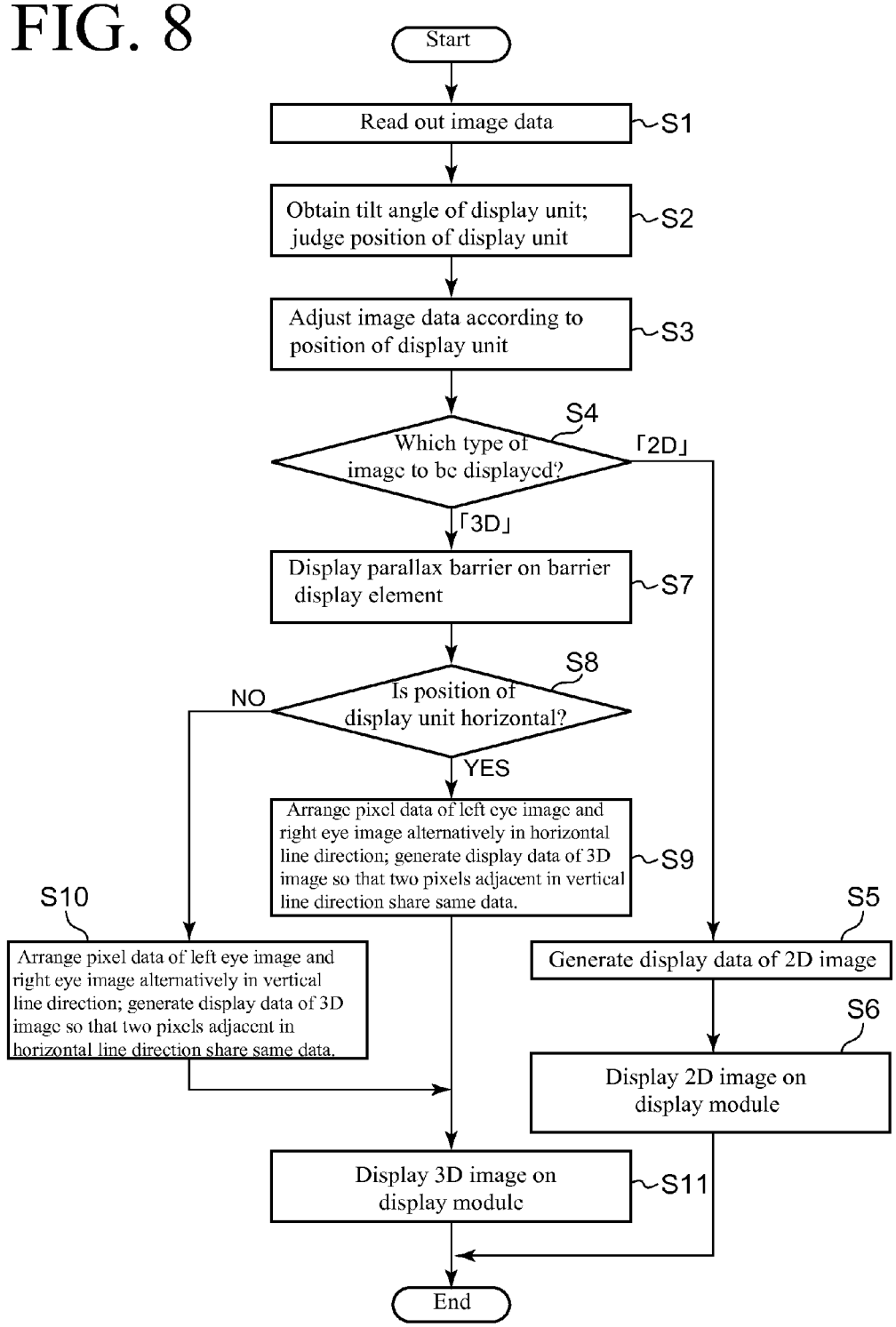
FIG. 8 is a flowchart showing an image display processing performed by a control unit.

FIG. 8 is a flowchart showing an image display processing performed by the control unit 52 when the mobile phone unit 1 displays a still image (hereinafter referred to simply as an image) on the display unit 7 according to image data stored in the data memory unit 55.

Now, the image display processing performed by the control unit 52 is described as follows according to FIG. 8. First, in the image display processing, the control unit 52 reads out image data of a display target from the data memory unit 55 (step S1). Note that the image as a display target may be an image chosen by a user (a viewer) who operates the buttons as designated.

Next, the control unit 52 judges the position of the display unit 7 according to angle information indicating the tilt angle of the display unit 7 provided by the angle detection unit 54 (step S2). The control unit 52 judges two types of positions of the display unit 7, horizontal position and vertical position, for example. In other words, the control unit 52 judges whether the condition of the display unit 7 is closer to the horizontal position or the vertical position. Here, the horizontal position means a condition in which the speaker 8 is positioned left, as shown in FIG. 1 and a left illustration of FIG. 10A, and therefore the long side direction A of the display unit 7 (the horizontal line direction H of the display module 9) matches with the left-right direction to the viewer's eye. Also, the vertical position means a condition in which the display unit 7 is rotated 90 degrees clockwise from the horizontal position and therefore the long side direction A of the display unit 7 matches with the up-down direction to the viewer's eye.

Next, the control unit 52 adjusts the image data according to the position of the display unit 7 judged in the processing of the step S2 (step S3). The adjustment processing of the image data is a processing to decrease the pixel size of the image data according to the number of pixels on the display module 9 both in the horizontal line direction H and the vertical line direction V thereof while maintaining an aspect ratio of the image data so that the image data are displayed in the maximum size on the screen of the display module 9. Note that the control unit 52 adjusts the image data of both a left eye image and a right eye image when the display target is a 3D image.

Subsequently, when the display target is a 2D image (step S4: "2D"), the control unit 52 provides the adjusted image data to the display data generation unit 53 and causes the display data generation unit 53 to generate display data of the 2D image (step S5). And, the control unit 52 provides the display data of the 2D image generated by the display data generation unit 53 to the display module 9 to drive the display module 9, thereby allowing the display module 9 to display the 2D image (step S6). In this case, the control unit 52 instructs the barrier display element 10 not to display the parallax barrier 100.

When the display target is a 3D image (step S4: "3D"), the control unit 52 immediately provides a predetermined drive voltage to the barrier display element 10, thereby instructing the barrier display element 10 to display the parallax barrier 100 as shown in FIG. 4B (step S7). Subsequently, the control unit 52 performs a processing to allow the display data generation unit 53 to generate display data of the 3D image according to the position of the display unit 7.

Figure 10A:
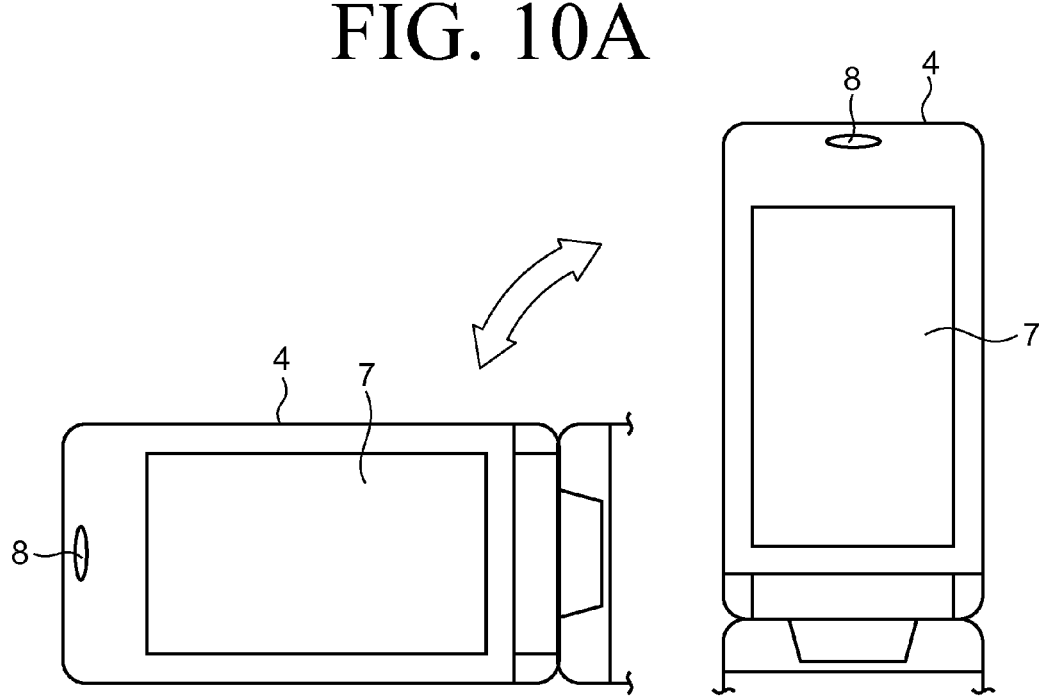
FIG. 10A is an illustration explaining a rotation direction of a mobile phone unit.

The following is a description of the processing in case that the position of the display unit 7 judged in the processing of the step S2 is the horizontal direction, as shown in the left illustration of FIG. 10A (step S8: YES); that is, for example, in case that the horizontal line direction H of the display module 9 matches with or nearly matches with the actual horizontal direction.

Figure 9A:
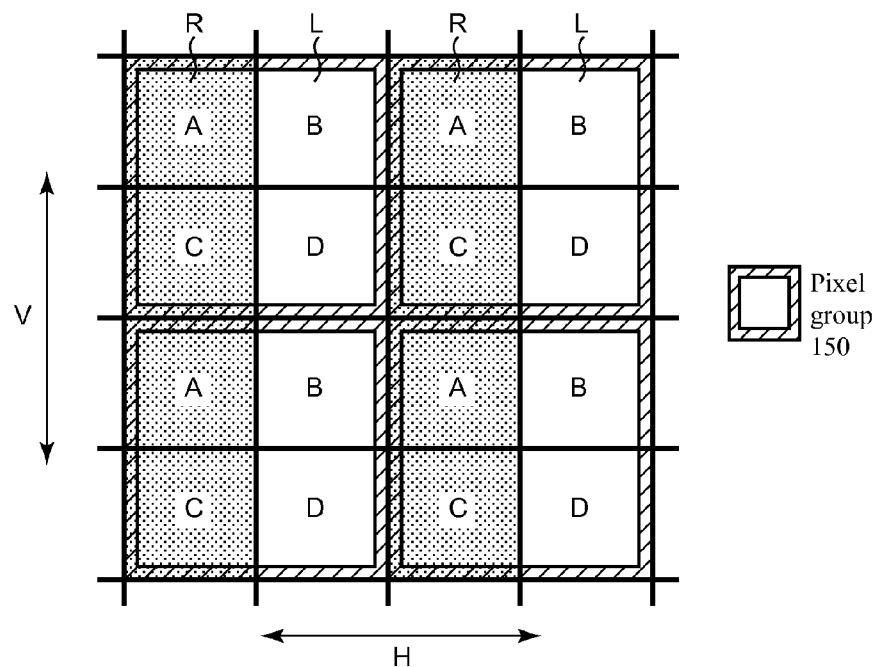
FIG. 9A is a schematic view showing display data of a 3D image.

When the position of the display unit 7 is horizontal, the control unit 52 provides image data of a processing target, that is, image data of a left eye image and a right eye image, to the display data generation unit 53, thereby causing the display data generation unit 53 to generate the display data of the 3D image as shown in FIG. 9A (step S9).

The display data generated by the display data generation unit 53 in the processing of the step S9 are the display data obtained by allocating pixel data for one vertical line of the left eye image and pixel data for one vertical line of the right eye image alternately to every one pixel on each vertical line of the display module 9 along the horizontal line direction H, while allocating the same pixel data to every two pixels of the same pixel group 150 on the same vertical line of the display module 9.

Specifically, when the display unit 7 is in the horizontal position the display data are obtained by allocating for each of the pixel groups 150 the identical pixel data of the right eye image to the two pixels A, C, which are the upper left and lower left pixels to the viewer's eye, and also by allocating the identical image data of the left eye image to the two pixels B, D, which are the upper right and lower right pixels to the viewer's eye.

In other words, the display data generated by the display data generation unit 53 are different from the display data obtained in a conventional parallax barrier system but instead are the display data obtained by allocating pixel data for one horizontal line of each of the left eye image and the right eye image to two horizontal lines vertically adjacent to the viewer's eye of the display module 9.

Next, the following is a description of a processing in case that the position of the display unit 7 judged in the processing of the step S2 is the vertical position as shown in the right illustration of FIG. 10A (step S8: NO); that is, for example, in case that the horizontal line direction H of the display module 9 matches with or nearly matches with the actual vertical direction.

Figure 9B:
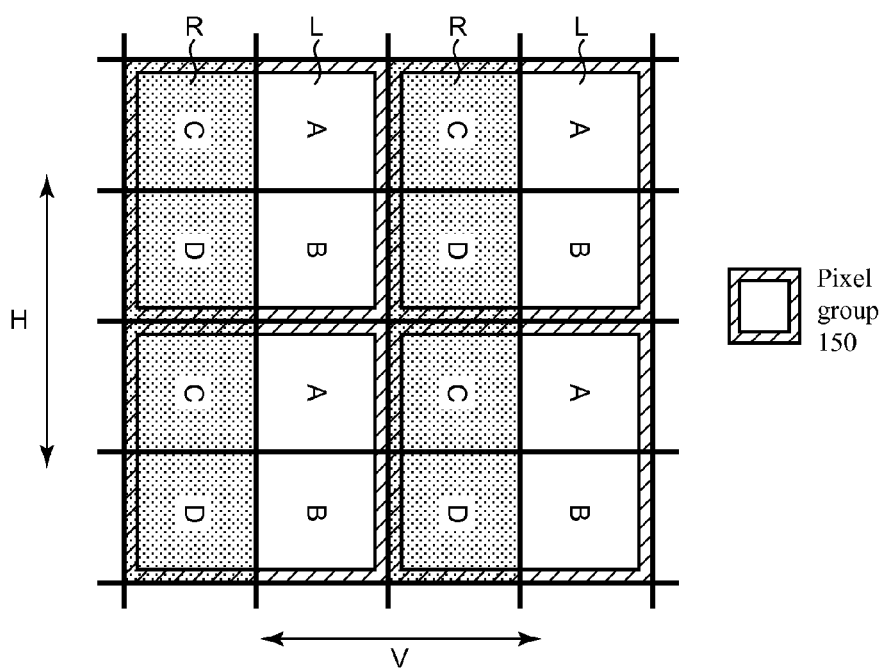
FIG. 9B is a schematic view showing display data of a 3D image.

When the display unit 7 is in the vertical position the control unit 52 provides image data of a processing target, that is, image data of a right eye image and a left eye image, to the display data generation unit 53, thereby allowing the display data generation unit 53 to generate the display data of a 3D image as shown in FIG. 9B (step S10).

The display data generated by the display data generation unit 53 in the processing of the step S10 are display data obtained by allocating pixel data for one vertical line of the left eye image and pixel data for one vertical line of the right eye image alternately to every one pixel on each horizontal line of the display module 9 along the vertical line direction V, while allocating the same pixel data to each two pixels of the same pixel group 150 on the same horizontal line of the display module 9.

Specifically, when the display unit 7 is in the vertical position, the display data are obtained by allocating for each of the pixel groups 150 the identical pixel data of the right eye image to the two pixels C, D, which are the upper left and lower left pixels to the viewer's eye, and also by allocating the identical image data of the left eye image to the two pixels A, B, which are the upper right and lower right pixels to the viewer's eye.

In other words, when the display unit 7 is in the vertical position, the display data generated by the display data generation unit 53 are different from the display data obtained in a conventional parallax barrier system, but instead are the display data obtained by allocating the pixel data of one horizontal line of each of the left eye image and the right eye image to two horizontal lines vertically adjacent to the viewer's eye of the display module 9.

The control unit 52 then provides the display data of the 3D image generated by the display data generation unit 53 in the processing of the step S9 or in the step S10, thereby causing the display module 9 to display the 3D image (step S11).

Figure 10B:
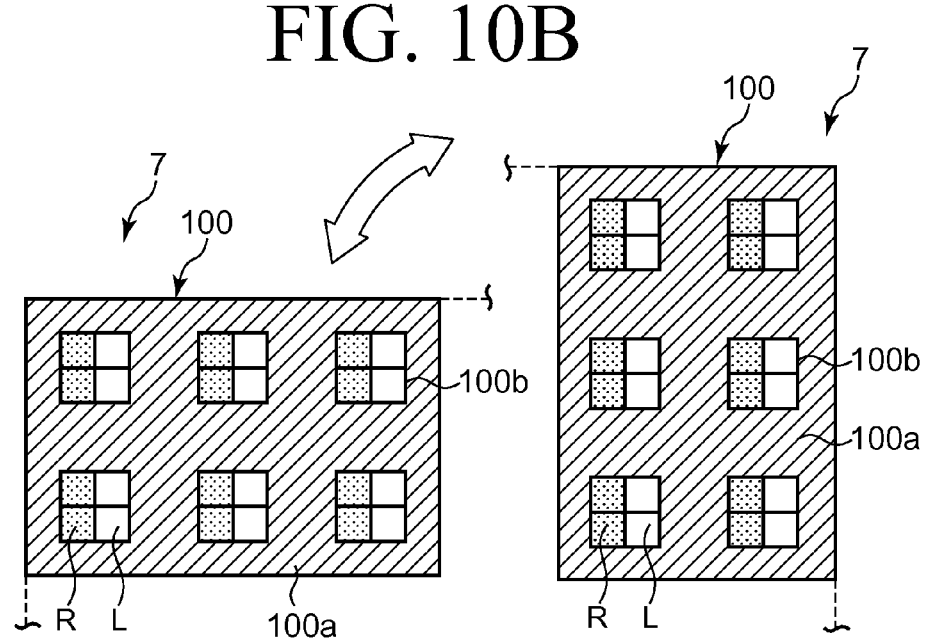
FIG. 10B is an illustration explaining an operation of displaying a 3D image on a mobile phone unit.

FIG. 10B corresponds to FIG. 10A and is a partially-enlarged view of the display unit 7 when a 3D image is displayed on the display unit 7 as a result of the control unit 52 performing the aforementioned image display processing.

As shown in FIG. 10B, when a 3D image is displayed on the display unit 7, the 3D image composed of the display data shown in FIG. 9A or FIG. 9B is displayed on the display module 9. In other words, regardless of the position of the display unit 7, a right eye image R is displayed on two upper and lower left pixels to the viewer of each of the pixel groups 150, while a left eye image L is displayed on two upper right and lower right pixels to the viewer of the pixel groups 150.

Meanwhile, as previously described, when the viewer views the display module 9 through each of the aperture regions 100b of the parallax barrier 100 from a designed, predetermined distance, a visible region on the display module 9 visible to the viewer's right eye contains two upper and lower left pixels to the viewer of each of the pixel groups 150. Similarly, a visible region on the display module 9 visible to the viewer's left eye contains two upper and lower right pixels to the viewer of each of the pixel groups 150.

Therefore, regardless of the position of the display unit 7, when a 3D image is displayed on the display unit 7, only two upper and lower left pixels of each of the pixel groups 150 of the display module 9 are visible to the viewer's right eye, while only two upper and lower right pixels of each of the pixel groups 150 of the display module 9 are visible to the viewer's left eye. As a result, the viewer can view three-dimensionally a 3D image displayed on the display unit 7 regardless of the position thereof without a need to change the barrier pattern on the barrier display element 10. Further, the viewer also can view three-dimensionally a colored 3D image with the same color quality regardless of the position of the display unit 7.

Figure 11B:
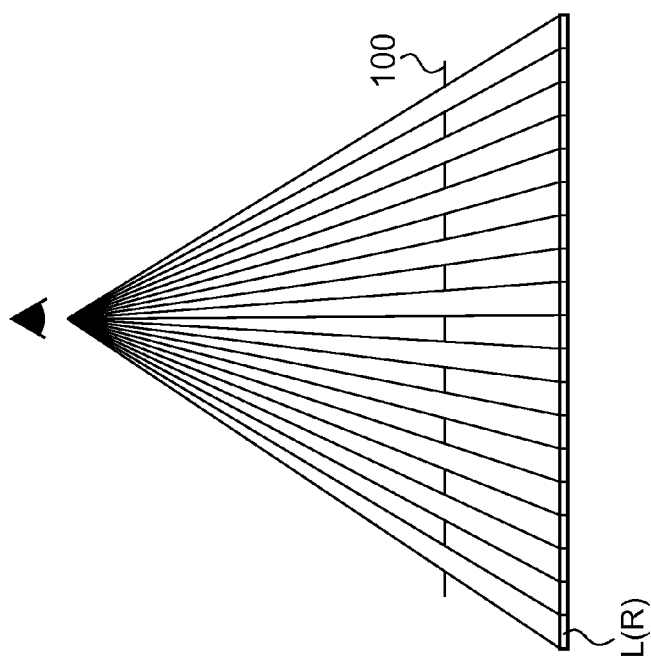
FIG. 11B is a side view showing lines of sight of a viewer viewing an image.
Figure 11A:
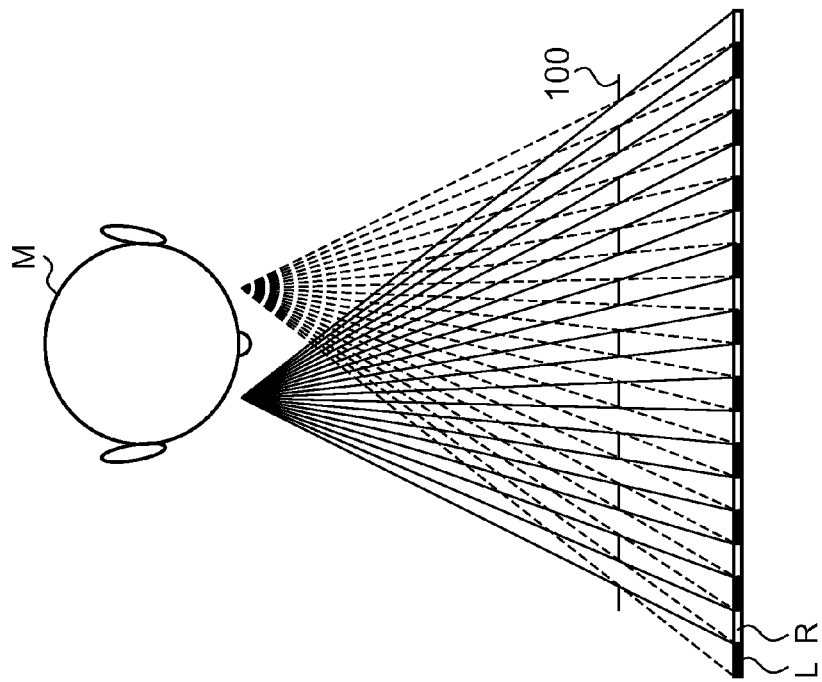
FIG. 11A is a plan view showing lines of sight of a viewer viewing an image.

FIG. 11A, FIG. 11B are schematic views showing lines of sight of a viewer M's right eye and left eye, which are common in both cases that the display unit 7 is in the horizontal position and that the display unit 7 is in the vertical position FIG. 11A is a plan view, while FIG. 11B is a side view.

Although not shown in the flowchart of FIG. 8, the control unit 52, when the mobile phone unit 1 displays a 3D image on the display unit 7, continuously monitors the position of the display unit 7 by performing the same processing as the processing of the step S2 after the processing of the step S11 is completed. Additionally, by recognizing the change of the position of the display unit 7 from horizontal to vertical or from vertical to horizontal as timing of display change, the control unit 52 repeatedly performs the processing of the step S8 through the step S11 while maintaining the parallax barrier 100 displayed on the barrier display element 10.

In the mobile phone unit 1, as described above, the parallax barrier 100 displayed by the barrier display element 10 possesses a specific pattern in which each of the aperture regions 100b is arranged in a matrix arrangement. Therefore, when a 3D image is displayed on the display unit 7, the mobile phone unit 1 is capable of making a 3D image recognized three-dimensionally by a viewer regardless of the position of the display module 9 without changing the pattern of the parallax barrier 100 based on the position of the display module 9.

Further, when the display unit 7 is in the horizontal position, the control unit 52, in displaying a 3D image, allocates pixel data for one horizontal line of each of the left eye image L and the right eye image R to two lines in the horizontal line direction H of the display module 9. Also, when the display unit 7 is in the vertical position the control unit 52 allocates pixel data for one horizontal line of each of the left eye image L and the right eye image R to two lines in the vertical line direction V of the display module 9.

In other words, in the 3D image displayed on the display module 9, the pixel data for one horizontal line of each of the left eye image L and the right eye image R are allocated to the two lines in the horizontal direction as viewed from the viewer, which are always vertically adjacent to the viewer's eye regardless of the position of the display unit 7.

Therefore, as previously described, the viewer can view a 3D image three-dimensionally with the same image quality regardless of the position of the display unit 7 even when the visible regions on the display module 9 corresponding to the aperture regions 100*b* are different depending on the position of the display unit 7 (the horizontal position or the vertical position).

Second Embodiment

Next, a second embodiment of the present invention is described. The second embodiment described below relates to a mobile phone unit possessing the same or similar configuration as the first embodiment shown in FIGS. 1 to 3 and FIG. 7, and in the mobile phone unit, a barrier display element 10 displays a parallax barrier possessing a specific pattern that is different from the first embodiment.

Figure 12:
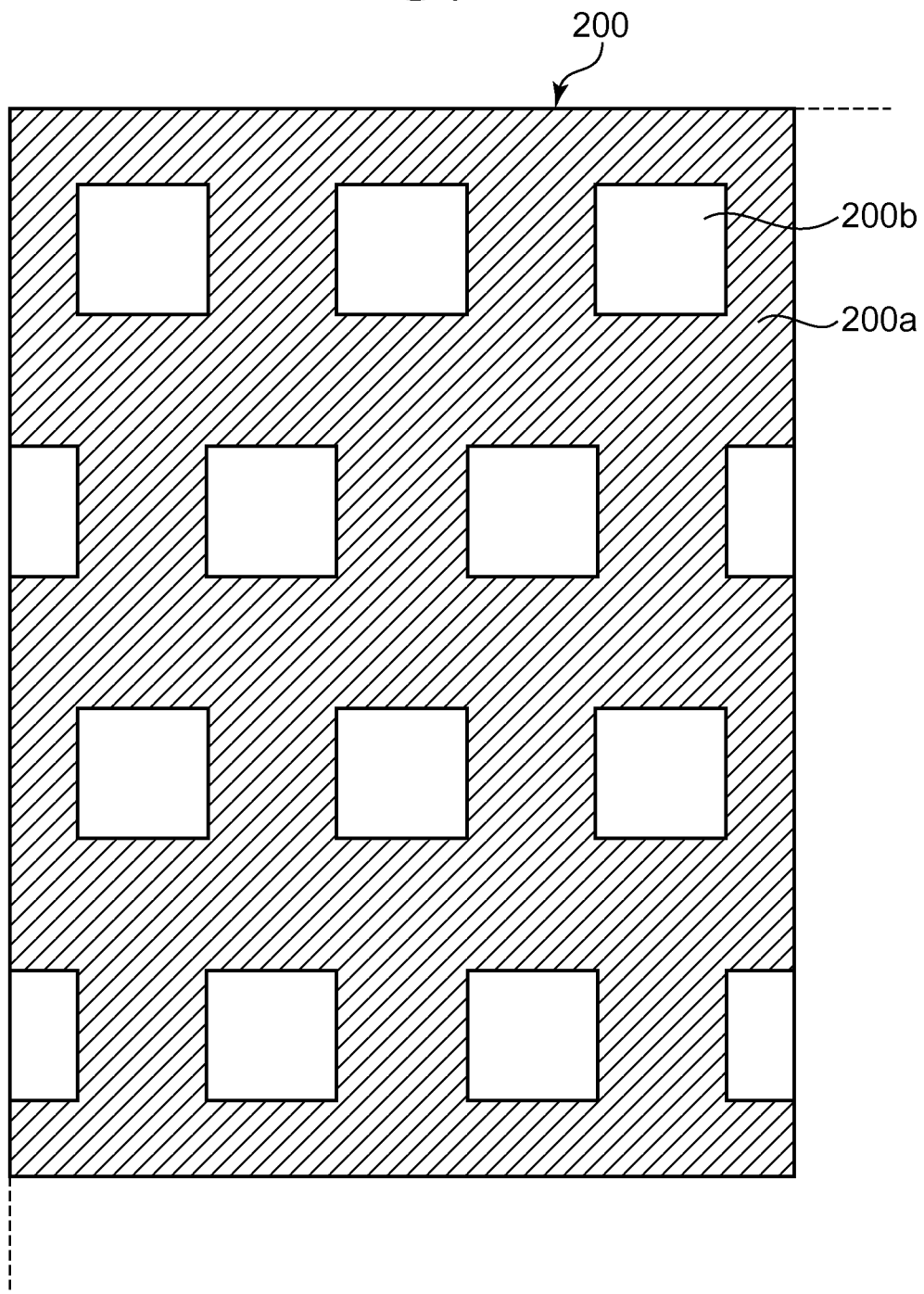
FIG. 12 is a schematic view showing a pattern of a parallax barrier in case of an embodiment 2.

In the barrier display element 10 of the present embodiment, either a transparent electrode 16 in an upper part of a liquid crystal cell 11 or a transparent electrode 17 in a lower part thereof is formed in a shape corresponding to a light-shielding region 200*a* of a parallax barrier 200 shown in FIG. 12. That is, when a designated drive voltage is applied to the transparent electrodes 16, 17, the barrier display element 10 blocks lights emitted by the display module 9 in a specific pixel region by displaying the parallax barrier 200 shown in FIG. 12.

As shown in FIG. 12, the parallax barrier 200 of the present embodiment possesses a specific pattern composed of the light-shielding region 200*a* that blocks light emitted by the display module 9 and also a plurality of aperture regions 200*b* that are orderly arranged and transmit light emitted by the display module 9. The shape and size of each of the aperture regions 200*b* are the same as the aperture region 100*b* of the parallax barrier 100 of the first embodiment.

However, in the parallax barrier 200 of the present embodiment, each of the aperture regions 200*b* is arranged in the horizontal direction at a specific interval between each other, and at the same time, every row of the aperture regions 200*b* is shifted in the horizontal direction so that any three adjacent aperture regions 200*b* are arranged in a triangle. Note that because the aperture regions 200*b* in FIG. 12 are arranged in a delta pattern, the arrangement thereof is referred to as a delta arrangement in the following description for convenience.

In the parallax barrier 200, each of the aperture regions 200*b* is respectively arranged in a position corresponding to each pixel group comprising four pixels adjacent to each other in both the horizontal line direction H and the vertical line direction V of the display module 9. A specific position relation between any aperture region 200*b* of the parallax barrier 200 and the pixel group corresponding to the same aperture region 200*b* is shown in FIG. 13.

Figure 13:
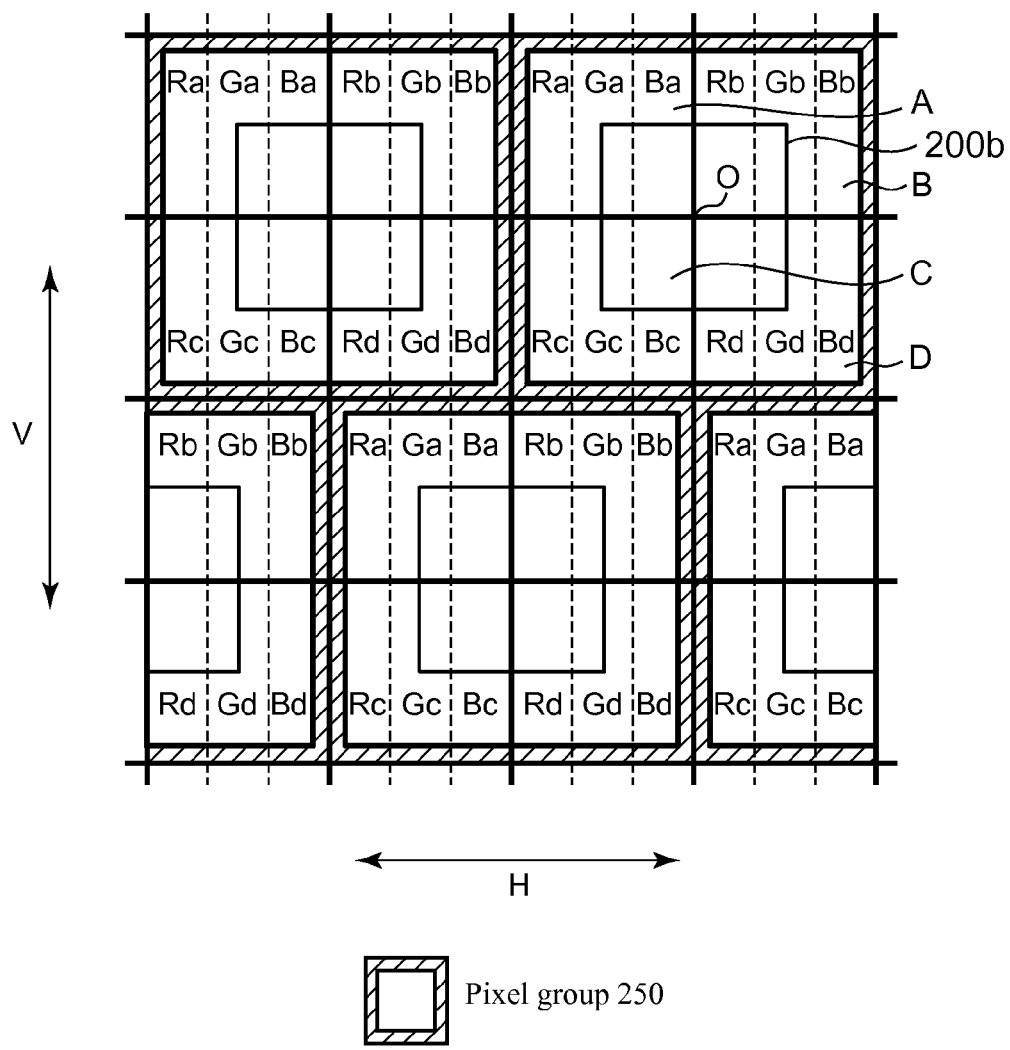
FIG. 13 is a schematic view showing a relation between an aperture region of a parallax barrier and a pixel group of a display module.

Specifically, FIG. 13 shows a position relation between an aperture region 200*b* and a pixel group 250 (pixels A, B, C, D) when the barrier display element 10 is viewed from an observational point, which is a reference point (one point) that exists on a line passing through the center of the barrier display element 10 (the display module 9) and vertical to a surface of the barrier display element 10 and that is located in a designed, predetermined distance from which a three-dimensional view of a 3D image is possible.

According to the present embodiment, as shown in FIG. 13, each of the pixel groups 250 to which each of the aperture regions 200*b* is corresponding is shifted in the horizontal line direction H on every row (every two horizontal lines) by one pixel so that each center O of the three adjacent pixel groups 250 is aligned in a triangle.

Also, in the parallax barrier 200 of the present embodiment as well, each of the aperture regions 200*b* is arranged so that the center thereof is positioned on a line connecting the aforementioned reference point and the center O of the pixel group 250 (pixels A, B, C, D) to which the aperture region 200*b* is corresponding.

Therefore, in the same manner as the first embodiment, when a viewer views the display module 9 from the aforementioned reference point while the parallax barrier 200 is being displayed on the barrier display element 10, visible regions on the screen of the display module 9 visible to the viewer's right eye or left eye through any of the aperture regions 200*b* are determined as described below.

FIG. 14A shows a visible region E that is visible to the viewer's right eye when the left-right direction to the viewer's eye matches with the horizontal line direction H of the display module 9. As shown in FIG. 14A, the visible region E visible to the viewer's right eye is a region spanning two pixels A, C, which are vertically-adjacent pixels on the left side of the pixel group 250 to which the aperture region 200*b* corresponds, and comprising a lower half of the upper left pixel A and an upper half of the lower left pixel C.

Also, FIG. 14B shows a visible region E that is visible to the viewer's left eye when the left-right direction to the viewer's eye matches with the horizontal line direction H of the display module 9. As shown in FIG. 14B, the visible region E visible to the viewer's left eye is a region spanning two pixels B, D, which are vertically-adjacent pixels on the right side of the pixel group 250 to which the aperture region 200*b* corresponds, and comprising a lower half of the upper right pixel B and an upper half of the lower right pixel D.

Further, according to the present embodiment, as in the same manner as the first embodiment, a relative position relation between four pixels composing any of the pixel groups 250 and the aforementioned visible region E is the same even when the display unit 7 (the display module 9 and the barrier display element 10) is rotated 90 degrees in the clockwise direction and thus the left-right direction to the viewer's eye matches with the vertical line direction V of the display module 9.

Figure 15A:
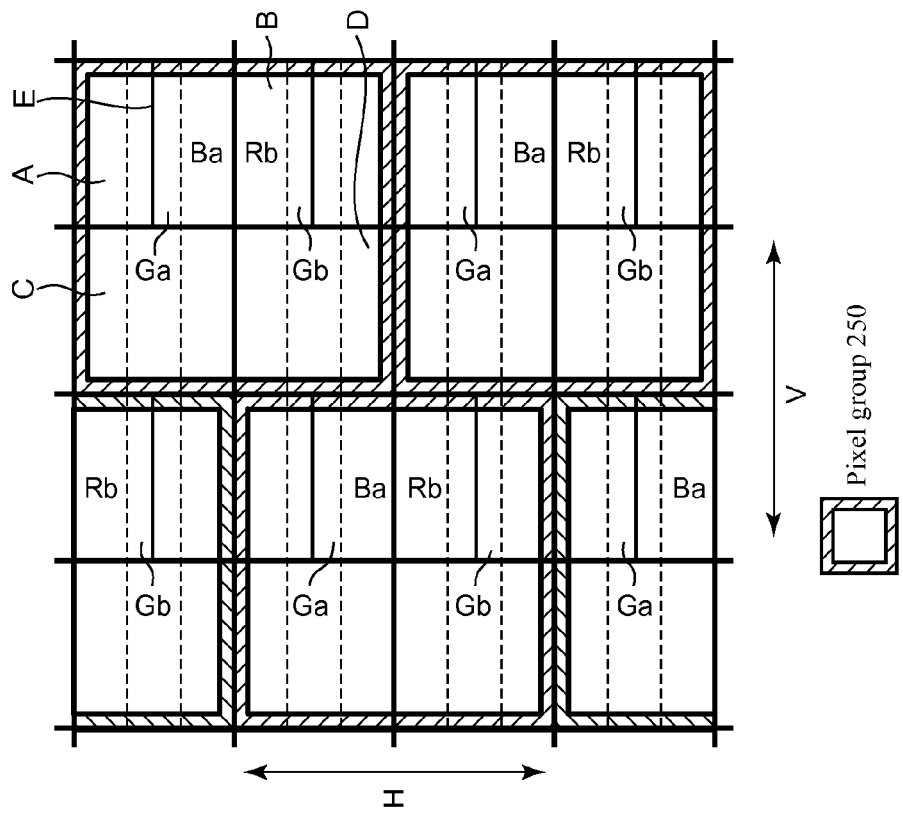
FIG. 15A is a schematic view showing a visible region of a display module visible to a viewer's right eye when a display unit is in a vertical position.
Figure 15B:
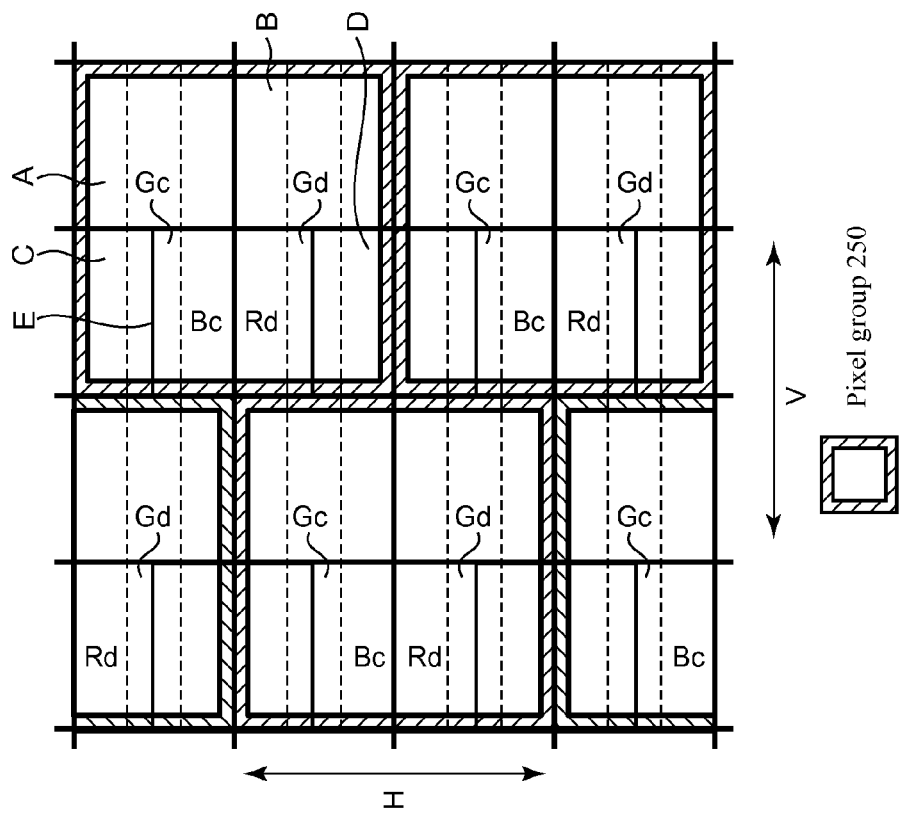
FIG. 15B is a schematic view showing a visible region of a display module visible to a viewer's left eye when a display unit is in a vertical position.

FIG. 15A corresponds to FIG. 14A and shows a visible region E visible to the viewer's right eye when the display unit 7 is rotated 90 degrees in the clockwise direction and the left-right direction to the viewer's eye matches with the vertical line direction V of the display module 9. Also, FIG. 15B corresponds to FIG. 14B and shows a visible region E visible to the viewer's left eye when the display unit 7 is rotated 90 degrees in the clockwise direction and the left-right direction to the viewer's eye matches with the vertical line direction V of the display module 9.

However, as previously described, the pixel arrangement of the display module 9 is directional. Therefore, as in the same manner as the first embodiment, specific ranges of sub-pixels contained in the visible region E visible to the viewer's right eye or left eye are different when the left-right direction to the viewer's eye matches with the horizontal line direction H of the display module 9 and when the left-right direction to the viewer's eye matches with the vertical line direction V of the display module 9.

Additionally, in the mobile phone unit of the present embodiment, the control unit 52 performs an image display processing shown in FIG. 8 as needed and controls the display unit 7 to display a 2D image or a 3D image. However, as previously described, the mutual position relation among the pixel groups 250 in a pixel region of the display module 9 to which each of the aperture regions 200*b* of the parallax barrier 200 corresponds is different from that among the pixel groups 150 described in the first embodiment. Therefore, when controlling the display unit 7 to display a 3D image, the control unit 52 controls the display data generation unit 53 to generate display data of the 3D image described below during the aforementioned processing of the step S9.

Figure 16A:
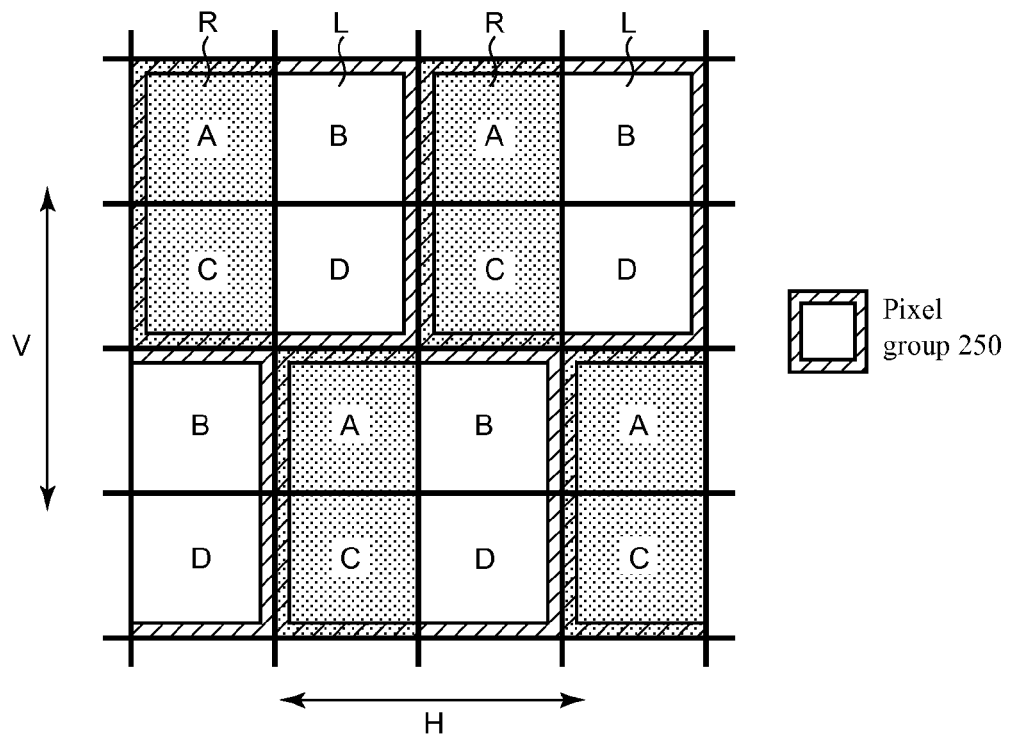
FIG. 16A is a schematic view showing display data of a 3D image.

FIG. 16A shows display data of a 3D image generated by the display data generation unit 53 during the processing of the step S9 when the display unit 7 is in the horizontal position, that is, in the direction shown in FIG. 1 and the left illustration of FIG. 10A. As shown in FIG. 16A, when the display unit 7 is in the horizontal position, the display data are obtained by allocating pixel data of the right eye image and pixel data of the left eye image alternately to every one pixel on the same horizontal line of the display module 9, while allocating the pixel data of the right eye image and the pixel data of the left eye image to every two pixels of the same pixel group 250 on the same vertical line of the display module 9. At the same time, when the display unit 7 is in the horizontal position, the display data are obtained by allocating the same pixel data to every two pixels of the same pixel group on the same vertical line of the display module 9.

In other words, when the position of the display unit 7 is horizontal, the display data are obtained by allocating identical pixel data of the right eye image to two vertically-adjacent pixels A, C on the left side to the viewer of each of the pixel groups 250, and at the same time, by allocating identical pixel data of the left eye image to two vertically-adjacent pixels B, D on the right side to the viewer of each of the pixel groups 250.

Meanwhile, according to the present embodiment, display data of a 3D image generated by the display data generation unit 53 under the control of the control unit 52 during the processing of the step S10, that is, display data when the display unit 7 is in a vertical position or in the direction shown in FIG. 1 and the right illustration of FIG. 10A, are the same as in the case of the first embodiment, as described below.

Figure 16B:
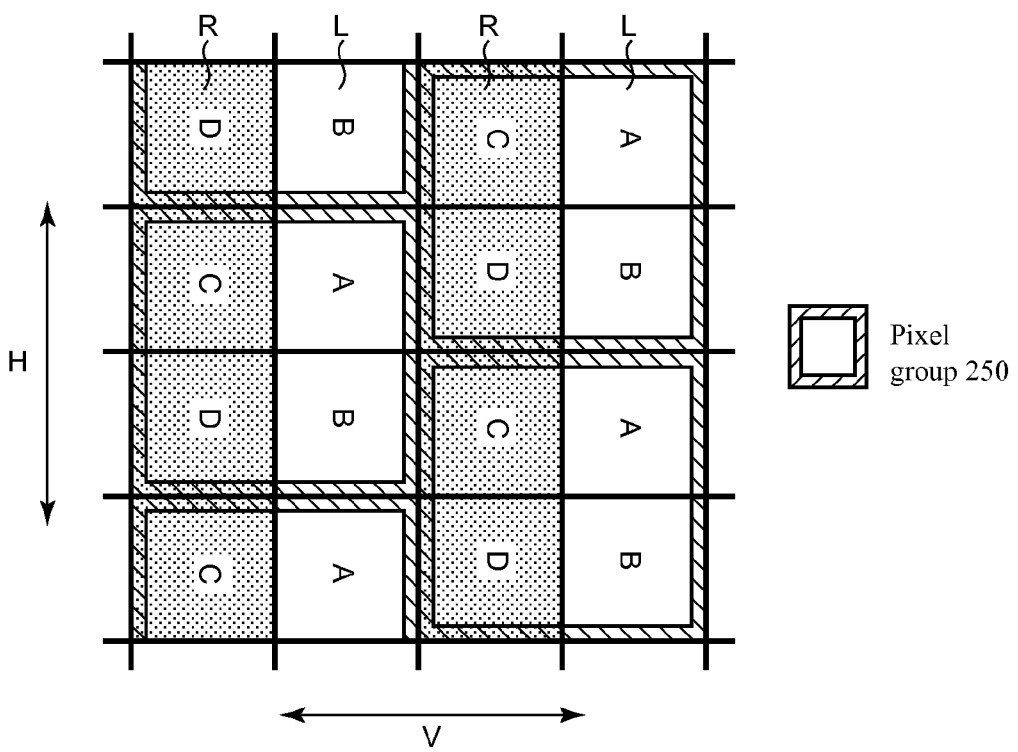
FIG. 16B is a schematic view showing display data of a 3D image.

FIG. 16B shows display data of a 3D image generated by the display data generation unit 53 during the processing of the step S10 when the display unit 7 is in a vertical position. As shown in FIG. 16B, when the display unit 7 is in the vertical position, the display data are obtained by allocating pixel data for one vertical line of the left eye image and pixel data for one vertical line of the right eye image alternately to each one pixel on each horizontal line of the display module 9 along the vertical line direction V, while allocating the same pixel data to each two pixels of the same pixel group 250 on the same horizontal line of the display module 9.

Specifically, when the display unit 7 is in the vertical position, the display data are obtained by allocating the same pixel data of the right eye image to two vertically-adjacent pixels C, D on the left side to the viewer of each of the pixel groups 250, while allocating the same pixel data of the left eye image to two vertically-adjacent pixels A, B on the right side to the viewer of each of the pixel groups 250.

Figure 17A:
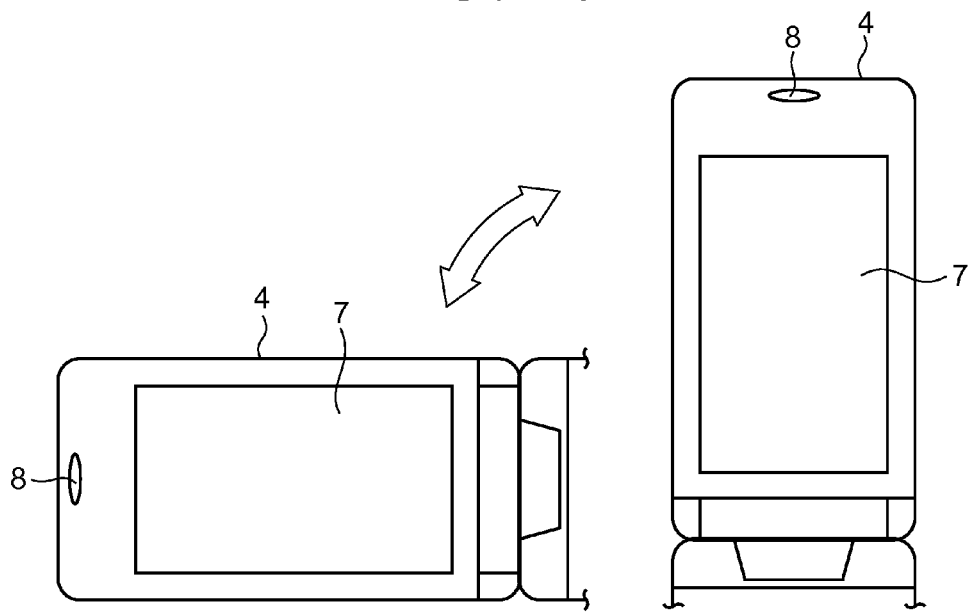
FIG. 17A is an illustration explaining a rotation angle of a mobile phone unit.
Figure 17B:
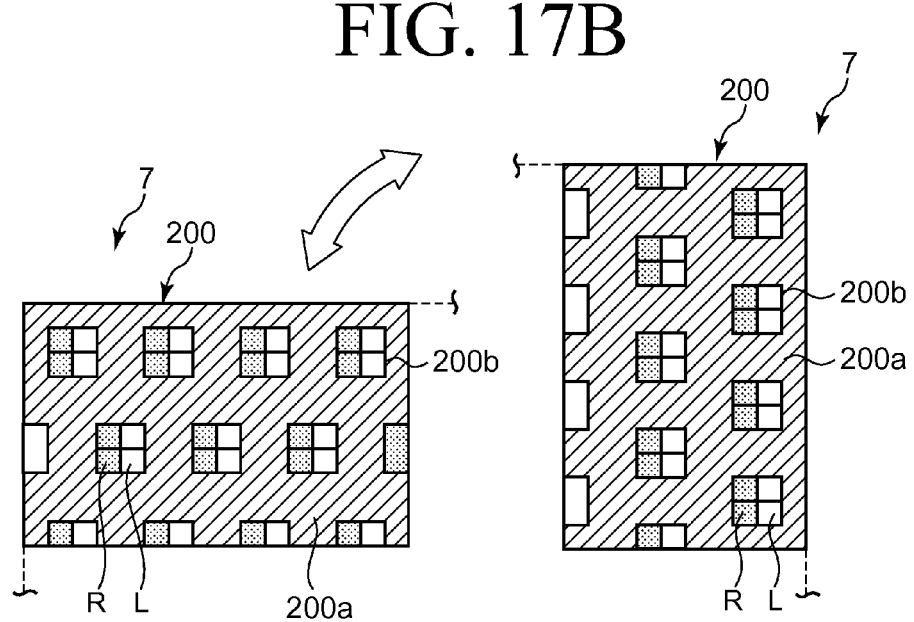
FIG. 17B is an illustration explaining the operation of displaying a 3D image on a mobile phone unit.

FIG. 17A, FIG. 17B correspond to FIG. 10A, FIG. 10B, respectively. Note that FIG. 17B is a partially-enlarged view of the display unit 7 when a 3D image is displayed thereon according to the present embodiment.

As shown in FIG. 17B, when a 3D image is displayed on the display unit 7, the 3D image composed of the display data shown in FIG. 16A or FIG. 16B is displayed on the display module 9. In other words, the display module 9 displays a right eye image R on two vertically-adjacent pixels on the left side to the viewer of each of the pixel groups 250 and a left eye image L on two vertically-adjacent pixels on the right side to the viewer of each of the pixel groups 250.

Additionally, as previously described, when the viewer views the display module 9 through each of the aperture region 200*b* of the parallax barrier 200 from a designed, predetermined distance, a visible region visible to the viewer's right eye of the display module 9 contains two vertically-adjacent pixels on the left side to the viewer of each of the pixel groups 250. In the same manner, a visible region visible to the viewer's left eye of the display module 9 contains two vertically-adjacent pixels on the right side to the viewer of each of the pixel groups 250.

Therefore, when a 3D image is displayed on the display unit 7, the viewer can, regardless of the position of the display unit 7, view with his/her right eye only the two vertically-adjacent pixels on the left side of each of the pixel groups 250 of the display module 9. In the same manner, the viewer can view with his/her left eye only the two vertically-adjacent pixels on the right side of each of the pixel groups 250 of the display module 9. As a result, the viewer can view three-dimensionally a 3D image displayed on the display unit 7 regardless of the position of the display unit 7 without a need to change the barrier pattern on the barrier 200. Further, the viewer can view a 3D image as a color image with the same color quality regardless of the position of the display unit 7.

According to the mobile phone unit of the present embodiment, as described above, the parallax barrier 200 displayed by the barrier display element 10 possesses a specific pattern in which each of the aperture regions 200*b* is arranged in a delta pattern, thereby making it possible to make the viewer view three-dimensionally a 3D image regardless of the position of the display module 9 without changing the pattern of the parallax barrier 200 depending on the position of the display module 9.

Further, in the present embodiment, when the display unit 7 is in the horizontal position, the control unit 52 allocates the pixels for one horizontal line of both the left eye image L and the right eye image R to two lines in the horizontal line direction H of the display module 9 to display a 3D image. Also, when the display unit 7 is in the vertical position, the control unit 52 allocates the pixels for one horizontal line of both the left eye image L and the right eye image R to two lines in the vertical line direction V of the display module 9 to display a 3D image.

In other words, in a 3D image displayed on the display module 9, the data for the pixels for one horizontal line of both the left eye image L and the right eye image R are allocated to two horizontal lines as viewed from the viewer, which are always positioned vertically adjacent to the viewer's eye regardless of the position of the display unit 7.

Therefore, as previously described, it is possible for the viewer to view a 3D image three-dimensionally with the same image quality regardless of the position of the display unit 7 even when visible regions corresponding to each of the aperture regions 200*b* of the display module 9 are different depending on the position (either the horizontal position or the vertical position) of the display unit 7.

Other Embodiments

According to the first and second embodiments described above, the control unit 52 is configured to judge whether the position of the display unit 7 is horizontal or vertical based on the angle information about the tilt angle of the display unit 7 provided by the angle detection unit 54, thereby automatically controlling the display direction of the 3D image on the display module 9. However, in applying the present invention to a mobile phone unit or any other display apparatuses, instead of automatically changing the display orientation, the display direction of a 3D image may be changed by recognizing instructions entered by a user operating the buttons as a triggering event for the display mode change.

Additionally, the specific configuration of the barrier display element 10 may be changed as needed as long as the parallax barrier 100 in which the aperture regions 100b are arranged in a matrix pattern or the parallax barrier 200 in which the aperture regions 200b are arranged in a delta pattern can be realized. For example, the barrier display element 10 may not be limited to the one with a fixed pattern of the parallax barrier to be displayed, but may be configured to enable a pattern change of the parallax barrier to be displayed, such as a passive type or active type liquid crystal panel and so forth in which pixels are arranged in a dot matrix form. Further, in case that the present invention is applied to a display apparatus that only displays 3D images, there may be provided a barrier display element 10 that forms a fixed parallax barrier possessing a specific pattern always in which the aperture regions are arranged in a matrix pattern or a delta pattern.

Also, the present invention can be applied to any display apparatus, and display apparatus may be configured so that a 3D image is displayed not on the entire display region of the display apparatus, but only on part of the display region thereof. In such a case, the parallax barrier may only have to correspond to the part of the display region on which a 3D image is displayed.

In the above-described embodiment of the present invention, pixels A, B, C, and D and aperture regions 100b (200b), etc., are in a square shape. Alternatively, a non-square, rectangular shape can be employed as the shapes of pixels A-D and aperture regions.

It will be apparent to those skilled in the art that various modification and variations can be made in the present invention without departing from the spirit or scope of the invention. Thus, it is intended that the present invention cover modifications and variations that come within the scope of the appended claims and their equivalents.

What is claimed is:

1. A display apparatus for displaying a three-dimensional image using a parallax barrier scheme, comprising:
   a display module having a display region having a plurality of pixels; and
   a parallax barrier unit facing the display region, the parallax barrier unit being configured to display a parallax barrier having a plurality of aperture regions for at least a portion of the display region, each of the aperture regions corresponds to a predetermined number of pixels, each of the aperture regions being in a shape that exhibits an identical shape when rotated 90 degrees, wherein said predetermined number of pixels is a group of four pixels,
   wherein one pixel is formed with three sub-pixels to each of which a different color component is respectively allocated,
   wherein each of the aperture regions is arranged so that the center thereof is positioned on a center of the group of four pixels corresponding to the each of the aperture regions, and
   wherein the aperture regions are arranged such that a visible area of sub-pixels visible to a right eye of a viewer viewing the display region through an aperture region from a predetermined position is the same among the color components and such that a visible area of sub-pixels visible to a left eye of the viewer is the same among the color components.

2. The display apparatus according to claim 1, wherein the display module has a color filter in a stripe arrangement.

3. The display apparatus according to claim 2, wherein the aperture regions are arranged such that a visible area of sub-pixels visible to a right eye of a viewer viewing the display region through an aperture region from a predetermined distance is the same among the color components and such that a visible area of sub-pixels visible to a left eye of the viewer is the same among the color components.

4. The display apparatus according to claim 2, wherein the aperture regions are arranged such that a visible area of the sub-pixels visible to a right eye of the viewer viewing the display region through an aperture region from a predetermined distance is the same among the color components and such that a visible area of the sub-pixels visible to a left eye of the viewer is the same among the color components, regardless of whether the display apparatus is held horizontally or vertically relative to the viewer's eyes.

5. The display apparatus according to claim 1, wherein the aperture regions are arranged such that two pixels among said group of pixels are visible at the same time to the right eye of the viewer through an aperture region and such that two pixels other than said two pixels among said group of pixels are visible at the same time to the left eye of the viewer through the aperture region.

6. The display apparatus according to claim 5, further comprising:
   a control unit allocating a same pixel data as a right eye image to each of the two pixels that are visible at the same time to the right eye of the viewer through the aperture region and also allocating a same pixel data as a left eye image to each of the two pixels that are visible at the same time to the left eye of the viewer through the aperture region.

7. The display apparatus according to claim 2, wherein the aperture regions are arranged in a matrix pattern.

8. The display apparatus according to claim 2, wherein the aperture regions are arranged in a delta pattern.

9. The display apparatus according to claim 1, wherein each of the aperture regions is in a square shape.

10. A display apparatus for displaying a three-dimensional image using a parallax barrier scheme, comprising:
    a display module having a display region in which a first pixel, a second pixel adjacent to the first pixel in a first direction, a third pixel adjacent to the first pixel in a second direction perpendicular to the first direction, and a forth pixel adjacent to the third pixel in the first direction are formed;
    a parallax barrier unit facing the display region, the parallax barrier unit being configured to display a parallax barrier having a plurality of aperture regions for at least a portion of the display region, each of the aperture regions corresponds to a predetermined number of pixels, each of the aperture regions being in a shape that exhibits an identical shape when rotated 90 degrees;

a control unit allocating pixel data to the pixels; and a judgment unit judging a rotational condition of the display module, wherein said predetermined number of pixels is a group of four pixels, wherein one pixel is formed with three sub-pixels to each of which a different color component is respectively allocated, wherein each of the aperture regions is arranged so that the center thereof is positioned on a center of the group of four pixels corresponding to the each of the aperture regions, wherein the aperture regions are arranged such that a visible area of sub-pixels visible to a right eye of a viewer viewing the display region through an aperture region from a predetermined position is the same among the color components and such that a visible area of sub-pixels visible to a left eye of the viewer is the same among the color components, wherein the control unit allocates a same pixel data as a right eye image to the first pixel and the second pixel and also allocates a same pixel data as a left eye image to the third pixel and the forth pixel when the judgment unit judges the rotational condition of the display module to be in a first rotational condition, and wherein the control unit allocates a same pixel data as a right eye image to the second pixel and the forth pixel and also allocates a same pixel data as a left eye image to the first pixel and the third pixel when the judgment unit judges the rotational condition of the display module to be in a second rotational condition that is rotated clockwise by 90 degrees from the first rotational condition.

11. The display apparatus according to claim 10, wherein the parallax barrier has aperture regions formed as light-transmissive regions that commonly correspond to the first pixel, the second pixel, the third pixel, and the forth pixel.

12. The display apparatus according to claim 11, wherein each of the aperture regions is in a shape that exhibits an identical shape when rotated 90 degrees.

13. The display apparatus according to claim 12, wherein when the display module is in the first rotational condition, the aperture regions are arranged such that the first pixel and the second pixel are both visible to a right eye of a viewer viewing the display region through a corresponding aperture region from a predetermined distance and such that the third pixel and the forth pixel are both visible to a left eye of the viewer through the aperture region.

14. The display apparatus according to claim 13, wherein when the display module is in the first rotational condition, the aperture regions are arranged such that neither the third pixel nor the forth pixel is visible to the right eye of the viewer viewing the display region through the aperture region from the predetermined distance and such that neither the first pixel nor the second pixel are visible to the left eye of the viewer thorough the aperture region.

15. The display apparatus according to claim 13, wherein when the display module is in the second rotational condition, the aperture regions are arranged such that the second pixel and the forth pixel are both visible to the right eye of the viewer viewing the display region through the aperture region from the predetermined distance and such that the first pixel and the third pixel are both visible to the left eye of the viewer through the aperture region.

16. The display apparatus according to claim 15, wherein when the display module is in the second rotational condition, the aperture regions are arranged such that neither the first pixel nor the third pixel is visible to the right eye of the viewer viewing the display region through the aperture region from the predetermined distance and such that neither the second pixel nor the forth pixel are visible to the left eye of the viewer through the aperture region.

17. The display apparatus according to claim 10, wherein the display module has a color filter in a stripe arrangement; and wherein each of the first pixel, the second pixel, the third pixel, and the forth pixel is composed of three sub-pixels to each of which a different color component is allocated.

18. The display apparatus according to claim 17, wherein the color filter is in a stripe arrangement such that the same color component extends in the first direction while the different color components are alternately arranged in the second direction.

19. An image control method for displaying a three-dimensional image using a parallax barrier scheme, comprising:

allocating a same pixel data as a right eye image to a first pixel and to a second pixel that is adjacent to the first pixel in a first direction and allocating a same pixel data as a left eye image to a third pixel that is adjacent to the first pixel in a second direction perpendicular to the first direction and to a forth pixel that is adjacent to the third pixel in the first direction, when a display module is in a first rotational condition; and allocating a same pixel data as a right eye image to the second pixel and to the forth pixel and allocating a same pixel data as a left eye image to the first pixel and to the third pixel, when the display module is in a second rotational condition that is rotated clockwise by 90 degrees from the first rotational condition, wherein the allocating of the same pixel data to the right eye and the allocating of the same pixel data to the left eye is performed via a parallax barrier having a plurality of aperture regions, each of the aperture regions corresponds to a predetermined number of pixels, each of the aperture regions being in a shape that exhibits an identical shape when rotated 90 degrees, wherein said predetermined number of pixels is a group of four pixels, wherein one pixel is formed with three sub-pixels to each of which a different color component is respectively allocated, wherein each of the aperture regions is arranged so that the center thereof is positioned on a center of the group of four pixels corresponding to the each of the aperture regions, wherein the aperture regions are arranged such that a visible area of sub-pixels visible to a right eye of a viewer viewing the display region through an aperture region from a predetermined position is the same among the color components and such that a visible area of sub-pixels visible to a left eye of the viewer is the same among the color components.

20. The display apparatus according to claim 1, wherein the parallax barrier unit is a fixed parallax barrier having said plurality of aperture regions.

21. The display apparatus according to claim 10, wherein the parallax barrier unit is a fixed parallax barrier having said plurality of aperture regions.

22. The display apparatus according to claim 10, wherein the judgment unit determines the rotational condition of the display modules based on a detection of an orientation of the display module.

23. The display apparatus according to claim 10, wherein the judgment unit determines the rotational condition of the display modules in accordance with instructions received from a user.

24. A display apparatus for displaying a three-dimensional image using a parallax barrier scheme, comprising:

a display module having a display region in which a plurality of pixels are arranged; and a parallax barrier unit facing the display region, the parallax barrier unit being configured to display a parallax barrier having a plurality of aperture regions for at least a portion of the display region such that each of the aperture regions corresponds to a predetermined group of pixels, each of the aperture regions being arranged and having a shape such that a left eye and a right eye of a viewer respectively receive light from mutually exclusive subgroups of pixels among said group of pixels when the display module is oriented horizontally with respect to the eyes of the viewer and such that the left eye and the right eye of the viewer respectively receive light from mutually exclusive different subgroups of pixels among said group of pixels when the display module is oriented vertically with respect to the eyes of the viewer, wherein each of the aperture regions being in a shape that exhibits an identical shape when rotated 90 degrees, wherein one pixel is formed with three sub-pixels to each of which a different color component is respectively allocated, wherein each of the aperture regions is arranged so that the center thereof is positioned on a center of the group of pixels corresponding to the each of the aperture regions, and wherein the aperture regions are arranged such that a visible area of sub-pixels visible to a right eye of a viewer viewing the display region through an aperture region from a predetermined position is the same among the color components and such that a visible area of sub-pixels visible to a left eye of the viewer is the same among the color components.

\* \* \* \* \*